May 17, 1966 N. E. HOAG 3,251,937

IMAGE TRANSMISSION SYSTEM AND METHOD

Filed Dec. 20, 1962 15 Sheets-Sheet 1

INVENTOR.
NELSON E. HOAG

BY Wood, Gust & Irish

ATTORNEYS

INVENTOR.
NELSON E. HOAG
BY Wood, Gust & Irish
ATTORNEYS

INVENTOR.
NELSON E. HOAG
BY Wood, Gust & Irish
ATTORNEYS

May 17, 1966 N. E. HOAG 3,251,937

IMAGE TRANSMISSION SYSTEM AND METHOD

Filed Dec. 20, 1962 15 Sheets-Sheet 4

INVENTOR.
NELSON E. HOAG

BY Wood, Gust & Irish

ATTORNEYS

IMAGE TRANSMISSION SYSTEM AND METHOD
Filed Dec. 20, 1962 15 Sheets-Sheet 5
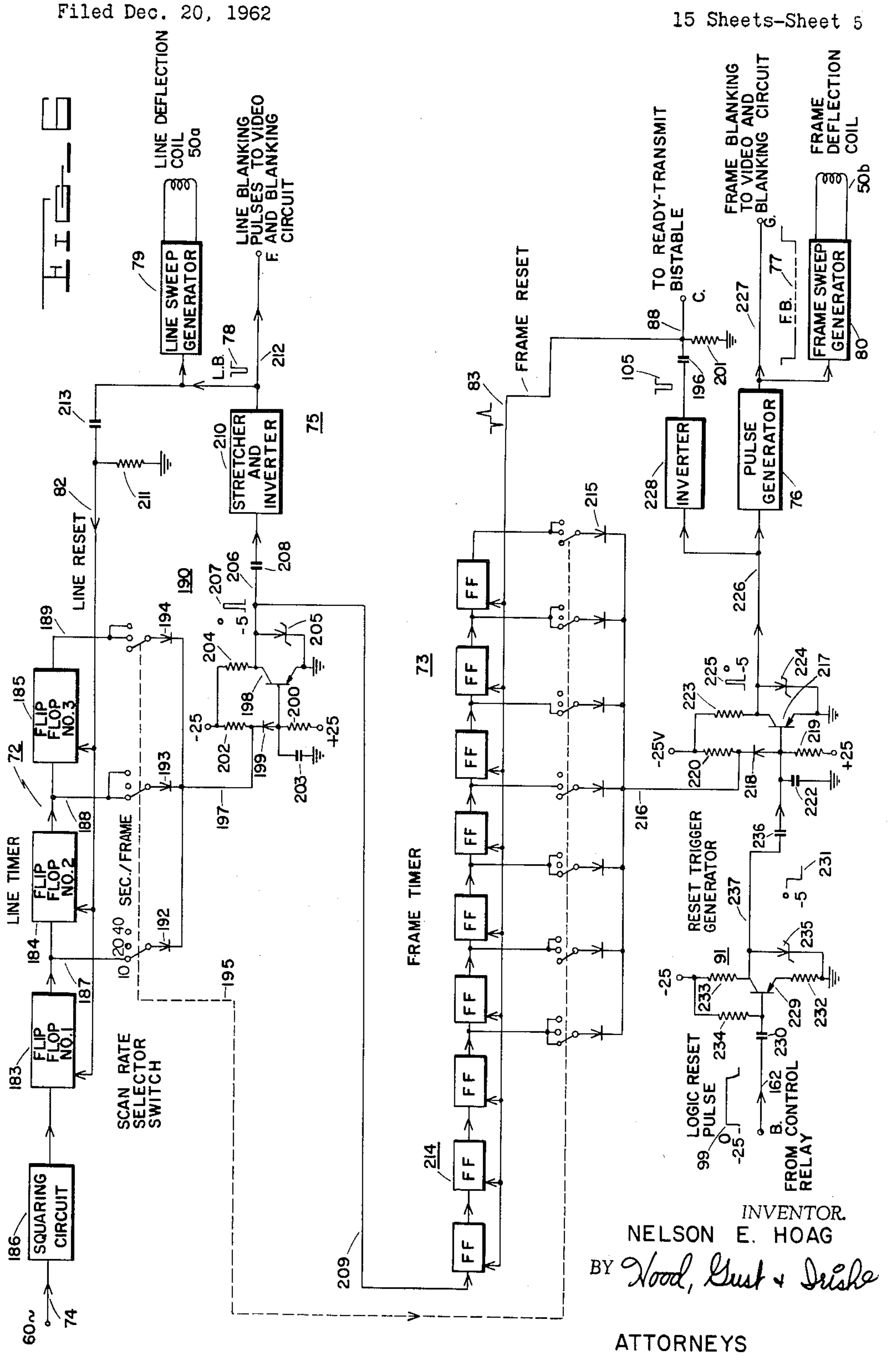
INVENTOR.
NELSON E. HOAG
BY Wood, Gust & Irish
ATTORNEYS

IMAGE TRANSMISSION SYSTEM AND METHOD

Filed Dec. 20, 1962 15 Sheets-Sheet 6

INVENTOR.
NELSON E. HOAG
BY Wood, Gust & Irish
ATTORNEYS

May 17, 1966 N. E. HOAG 3,251,937
IMAGE TRANSMISSION SYSTEM AND METHOD
Filed Dec. 20, 1962 15 Sheets-Sheet 7
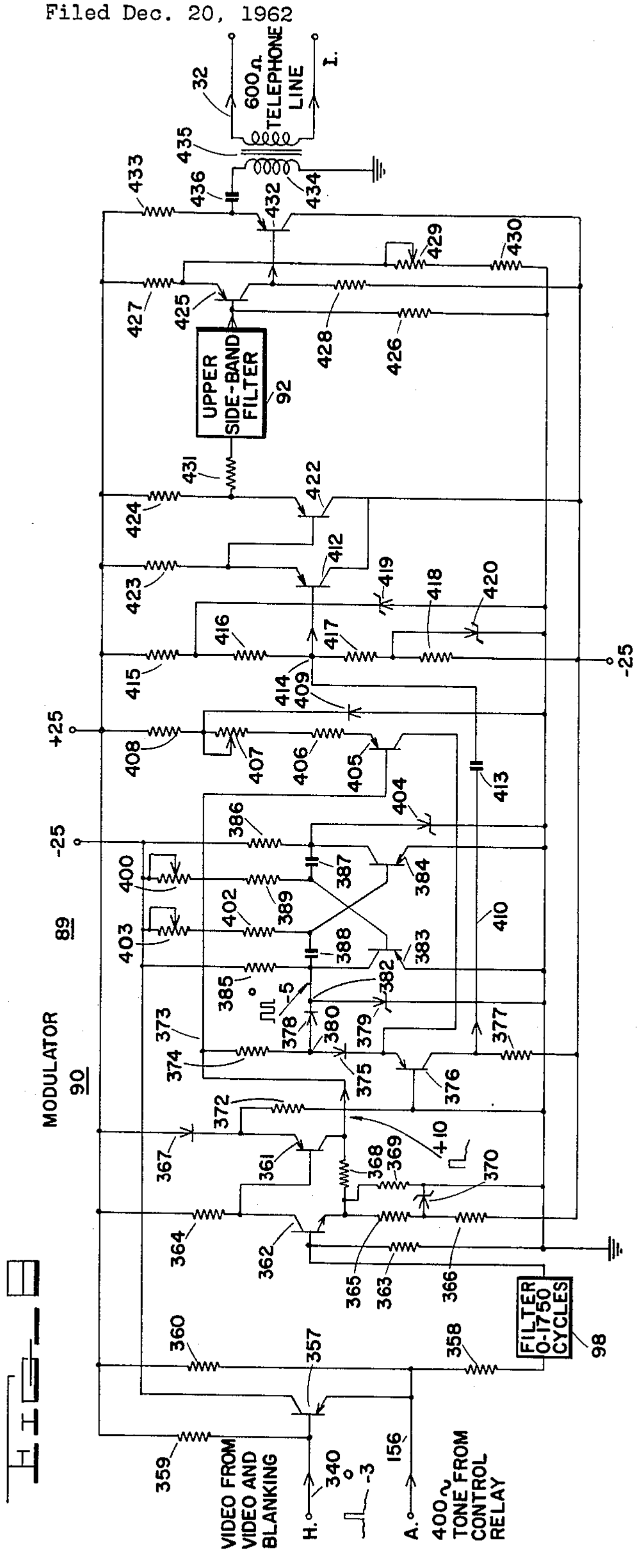
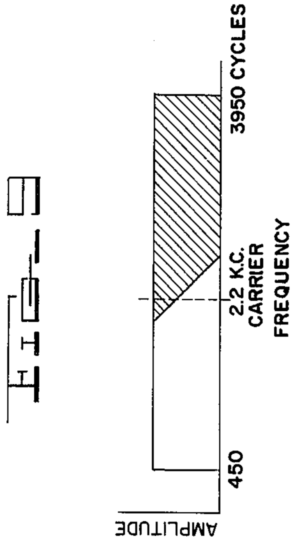
INVENTOR.
NELSON E. HOAG
BY Wood, Gust & Irish
ATTORNEYS

IMAGE TRANSMISSION SYSTEM AND METHOD

INVENTOR.
NELSON E. HOAG
BY Wood, Gust & Irish
ATTORNEYS

INVENTOR.
NELSON E. HOAG
BY Hood, Gust & Irish
ATTORNEYS

May 17, 1966 N. E. HOAG 3,251,937

IMAGE TRANSMISSION SYSTEM AND METHOD

Filed Dec. 20, 1962 15 Sheets-Sheet 10

INVENTOR.
NELSON E. HOAG
BY Wood, Gust & Irish
ATTORNEYS

IMAGE TRANSMISSION SYSTEM AND METHOD

Filed Dec. 20, 1962

INVENTOR.
NELSON E. HOAG
BY Wood, Gust & Irish
ATTORNEYS

INVENTOR.
NELSON E. HOAG
BY Wood, Gust & Irish
ATTORNEYS

May 17, 1966 N. E. HOAG 3,251,937

IMAGE TRANSMISSION SYSTEM AND METHOD

Filed Dec. 20, 1962 15 Sheets-Sheet 13

INVENTOR.
NELSON E. HOAG
BY Wood, Gust & Irish
ATTORNEYS

INVENTOR.
NELSON E. HOAG
BY Hood, Gust + Irish
ATTORNEYS

IMAGE TRANSMISSION SYSTEM AND METHOD

Filed Dec. 20, 1962

INVENTOR.
NELSON E. HOAG
BY *Hood, Gust & Irish*
ATTORNEYS 3,251,937

IMAGE TRANSMISSION SYSTEM AND METHOD

Nelson E. Hoag, Fort Wayne, Ind., assignor to International Telephone and Telegraph Corporation, Nutley, N.J., a corporation of Maryland Filed Dec. 20, 1962, Ser. No. 246,103
34 Claims. (Cl. 178—6.8)

This invention relates to a television system and method for transmitting images, and more particularly to an automated narrow band television system for transmitting still pictures over a voice band transmission facility, such as a telephone line.

Conventional television systems, by virtue of their fast scanning rates which are required in order to transmit moving images, require an extremely wide band transmission facility. There are numerous instances, however, where it is not necessary to transmit a moving image, but on the contrary it is only desired to transmit a still picture rapidly, either from previously prepared flat copy, or from a moving scene. It is highly desirable that a system for transmitting still pictures be capable of operation over ordinary voice band telephone lines, even at great distances, and that appreciable viewing time be provided at the receiving station. Applications for such a system for the rapid transmission of still pictures over ordinary telephone channels include signature verification, the transmission of printed or written documents, photographs, drawings, and the like, and the transmission of still pictures from moving scenes such as in news picture gathering, traffic control, and the like.

Conventional closed circuit television systems have been employed for the above purposes, however, as indicated, a wide band transmission facility such as coaxial cable or a microwave link is required, and furthermore, unless a photograph is taken of the image on the display screen at the receiving station, there is no storage of the transmitted picture to permit viewing of the same after transmission has been terminated. Conventional facsimile systems have been employed for the transmission of previously prepared flat copy pictures, however, such systems are limited to flat copy of limited size and the transmission of a single picture requires appreciable time, i.e., ordinarily from 3 to 10 minutes. Furthermore, a facsimile system is not capable of instantaneously transmitting a still picture from a moving scene.

It is further desirable that such a system for still picture transmission be automated to the extent that actuation of a single "transmit" switch button will expose the picture to be transmitted to the image tube, cause erasure of a previously stored picture and restoration of the apparatus at the receiving station to a condition for reception of a new picture, cause transmission of the new picture, and provide an indication at the transmitting station that the picture has been transmitted and that the system is now capable of transmitting another picture.

It is accordingly an object of the invention to provide an improved image transmission system.

Another object of the invention is to provide an improved television system for transmitting still pictures.

A further object of the invention is to provide an improved narrow band television system for transmitting still pictures.

Yet another object of the invention is to provide an automated television system for transmitting still pictures.

A still further object of the invention is to provide an improved television system for transmitting still pictures over a voice band transmission facility.

A still further object of the invention is to provide an improved method of transmitting a still picture.

In accordance with the broader aspects of the system of the invention, image tube means are provided having target means for converting an optical image exposed thereto into a corresponding electrical characteristic pattern and for storing the same for a finite time. Selectively actuable shutter means are provided for exposing the target means to an optical image and the image tube means includes selectively actuable means for converting the stored pattern into a time-based video signal. Means are provided for generating a control signal and means are provided for modulating an input signal to provide an output transmission signal. Control means are provided for actuating the shutter means for a predetermined period thereby to expose the optical image to the target means, the control means including means for coupling the control signal to the modulating means for a predetermined period thereby to modulate the transmission signal. The control means further includes means for actuating the image tube converting means following termination of the exposing and control signal periods and means are provided for coupling the video signal to the modulating means thereby to modulate the transmission signal. Means are provided for demodulating the transmission signal to recover the control and video signals, respectively, and signal-to-image converting means are provided for converting the recovered video signal into an optical image. The converting means includes storage means for maintaining the optical image for a finite time following termination of the video signal, and means are provided for coupling the control signal to the storage means for erasing a previously stored optical image.

In accordance with the method of the invention, an optical image is exposed to the target means of an image tube for a predetermined period and a control signal is transmitted during the same period. The image stored on the target means is then converted into a time-based video signal and transmitted during an interval following the exposing period. The control signal is received and applied to storage signal-to-image converting means for erasing a previously stored image, and the video signal is received and converted into an optical image on the converting means.

More particularly, in accordance with the method of the invention, recurrent sequences of frame synchronizing pulses and intervening line synchronizing pulses are generated. In order to transmit a new picture, a new sequence of pulses is initiated and an optical image is exposed to the target means of the image tube for a predetermined period during the first frame pulse of the new sequence of pulses. A tone signal is generated for a predetermined period during the first pulse of a new sequence and the tone is amplitude modulated onto a carrier and the resultant signal transmitted. The target means of the image tube is rectilinearly scanned once with an electron beam in synchronism with the synchronizing pulses during the new sequence following the first frame pulse thereof to convert the optical image on the target means into a video signal, and the carrier is modulated with the video signal and the resultant signal is transmitted. The transmitted signals are received and the tone and video signals are recovered, the tone signal being converted into a control signal which is supplied to the storage means of direct viewing storage cathode ray tube means for erasing a previously stored image. The video signal is converted into an electron beam in the storage tube means that is scanned once over the storage means in synchronism with the synchronizing pulses during the new sequence of pulses following the first frame pulse thereof.

The above-mentioned and other features and objects of this invention and the manner of attaining them will become more apparent and the invention itself will be best understood by reference to the following description of an embodiment of the invention taken in conjunction with the accompanying drawings, wherein:

FIG. 5 is a diagram schematically illustrating the control relay and associated circuitry of the system of FIG. 2;

FIG 6 is a diagram schematically illustrating the line and frame blanking pulse timing and generating portions of the system of FIG. 2;

FIG. 8 is a schematic diagram of the modulator portion of the system of FIG. 2;

FIG. 9 is a diagram showing the action of the upper sideband filter of the modulator of FIG. 8;

FIG. 16 is a diagram showing wave forms employed in the receiving system;

Figure 1:
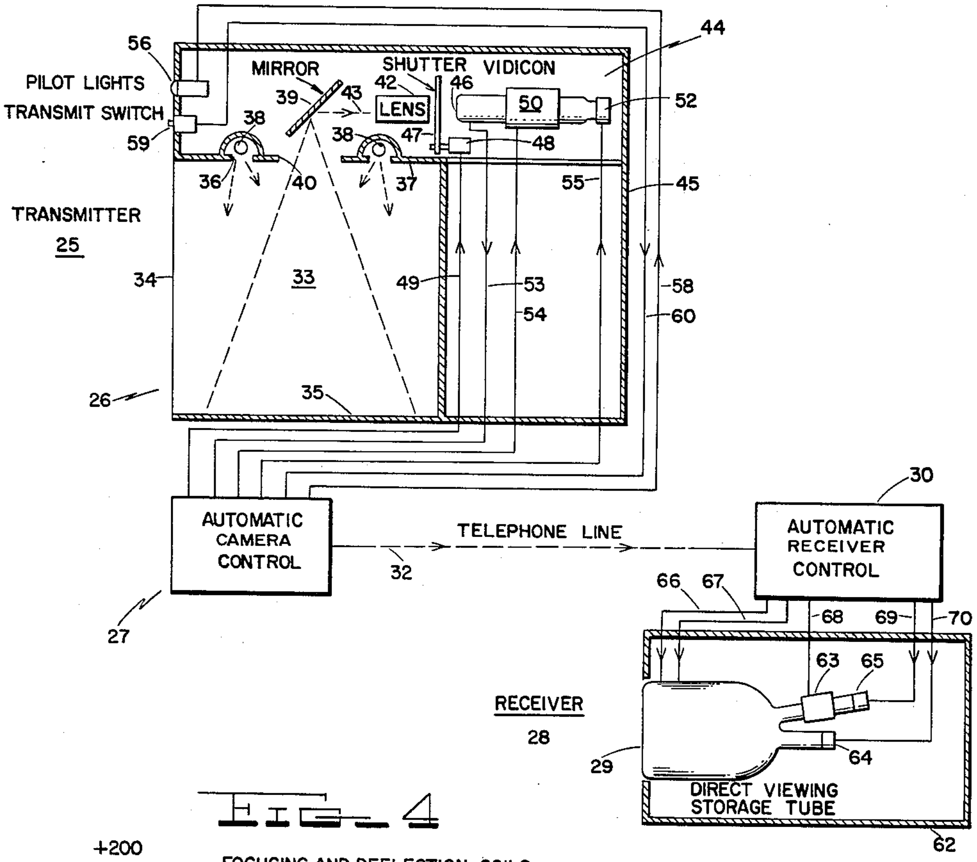
FIG. 1 is a diagram schematically showing the transmitting and receiving stations of a system incorporating the invention.

Referring now to FIG. 1 of the drawings, the system of the invention includes a transmitting station 25 comprising a camera unit 26 and a control unit 27, and a receiving station 28 comprising a direct viewing storage cathode ray tube 29 and the control circuitry 30 thereof. The transmitting station 25 and the receiving station 28 may, in accordance with the invention, be connected by an ordinary voice band telephone line, shown by the dashed line 32, or may be interconnected by any radio link.

The transmitting station 25 shown in the drawing is adapted for transmitting still pictures of flat copy and also three-dimensional objects, as opposed to pictures "snapped" from a moving scene. Here the camera unit 26 comprises a picture-taking enclosure 33 open at its end 34 and having a flat copying surface 35. Thus, the photograph, document, or object, a picture of which is to be transmitted, is inserted in the enclosure 33 through opening 34 and placed on the copying surface 35. The document or object is illuminated through openings 36 in the top wall 37 of enclosure 33 by suitable lamps such as fluorescent tubes 38. A suitable mirror 39 views the object on the copying surface 35 through opening 40 in the top wall 37 and reflects the image thereof onto a suitable lens 42, as shown by the dashed line 43.

A suitable camera or image tube 44, such as a vidicon tube No. WL7290 is disposed within the housing 45 so that its target 46 receives the optical image from lens 42. A mechanical shutter 47 is normally disposed between the lens 42 and the target 46 of the image tube 44 to prevent exposure of the target 46 to light, so that the target is normally dark, as will be hereinafter more fully described. Shutter 47 is actuated by solenoid 48 to expose target 46 to the image from lens 42 for a predetermined period, as will hereinafter be described. Solenoid 48 is connected to the camera control unit 27 by connection 49 and is energized thereby as will be hereinafter described. Target 46, deflection coils 50 and the electron gun 52 of image tube 44 are likewise connected to the camera control unit 27 by connections 53, 54 and 55, as will be hereinafter more fully described. Suitable pilot lights 56 mounted on the front of housing 45 are connected to the camera control unit 27 by connection 58 and indicate when the system is ready to transmit a new picture, and when a picture is in the process of transmission, as will be hereinafter described. Transmission of a new picture is initiated, as will be described, by transmit switch 59 on the front of housing 45 connected to the camera control unit by connection 60.

The direct viewing storage cathode ray tube 29, such as No. FW-245 manufactured by the assignee of this application, is mounted in housing 62 and has its display screen, storage electrode 113, deflection coils 63, writing gun 65, and flood gun 64 connected to the receiver control unit 30 by connections 66, 67, 68, 69 and 70, as will be hereinafter described.

In the system of this invention, the storage capability of the vidicon camera tube is substantially increased by the employment of selenium for the photoconductive surface of the target electrode rather than antimony trisulfide as is customarily employed. This permits the image to be stored on the photoconductive surface by means of the lens 42 and shutter 47 for a sufficient length of time to permit scanning of the target electrode in the slow scan parameters necessary to produce a narrow band video signal for transmission over voice band facilities. In a specific embodiment of this system, the scanning rates are such as to provide a narrow band video signal from 0 to 1.7 kc. which is amplitude modulated onto a 2.2 kc. carrier, the modulating signal and upper sideband components being eliminated so as to transmit only the lower side band and carrier components in a vistigal sideband manner.

At the receiving station, the transmitted signal is detected in a manner which permits the highest video frequency to approach .9 of the carrier frequency, as will be hereinafter more fully described. The detected narrow band and video signal is then written into the direct viewing storage cathode ray tube 29 for display, the circuitry at the receiving station providing storage of the displayed image for periods from six to eight minutes following transmission of the picture; a single picture is completely transmitted in one frame, the frame time being selectively adjustable at 10, 20 or to 40 seconds, depending on the resolution desired.

The system is completely automated so that the operator at the transmitting station need only place the document in position in the enclosure 33 and momentarily press the transmit switch button 59, the camera control 27 then automatically actuating the shutter 47 to expose the image to the vidicon 44, causing transmission of a control signal to erase a previously stored image from the display screen of the storage tube 29 at the receiving station and to restore the storage tube to a condition to receive a new image, causing transmission of the new picture following exposure of the vidicon thereto, and finally terminating transmission at the end of one frame and providing an indication on the pilot lights 56 that the system is now ready to transmit yet another picture.

The system further includes circuitry to be hereinafter more fully described, to improve the contrast and readability of documents having different background colors thus to compensate for the variation in sensitivity of the vidicon tube 44 to different colors.

Figure 2:
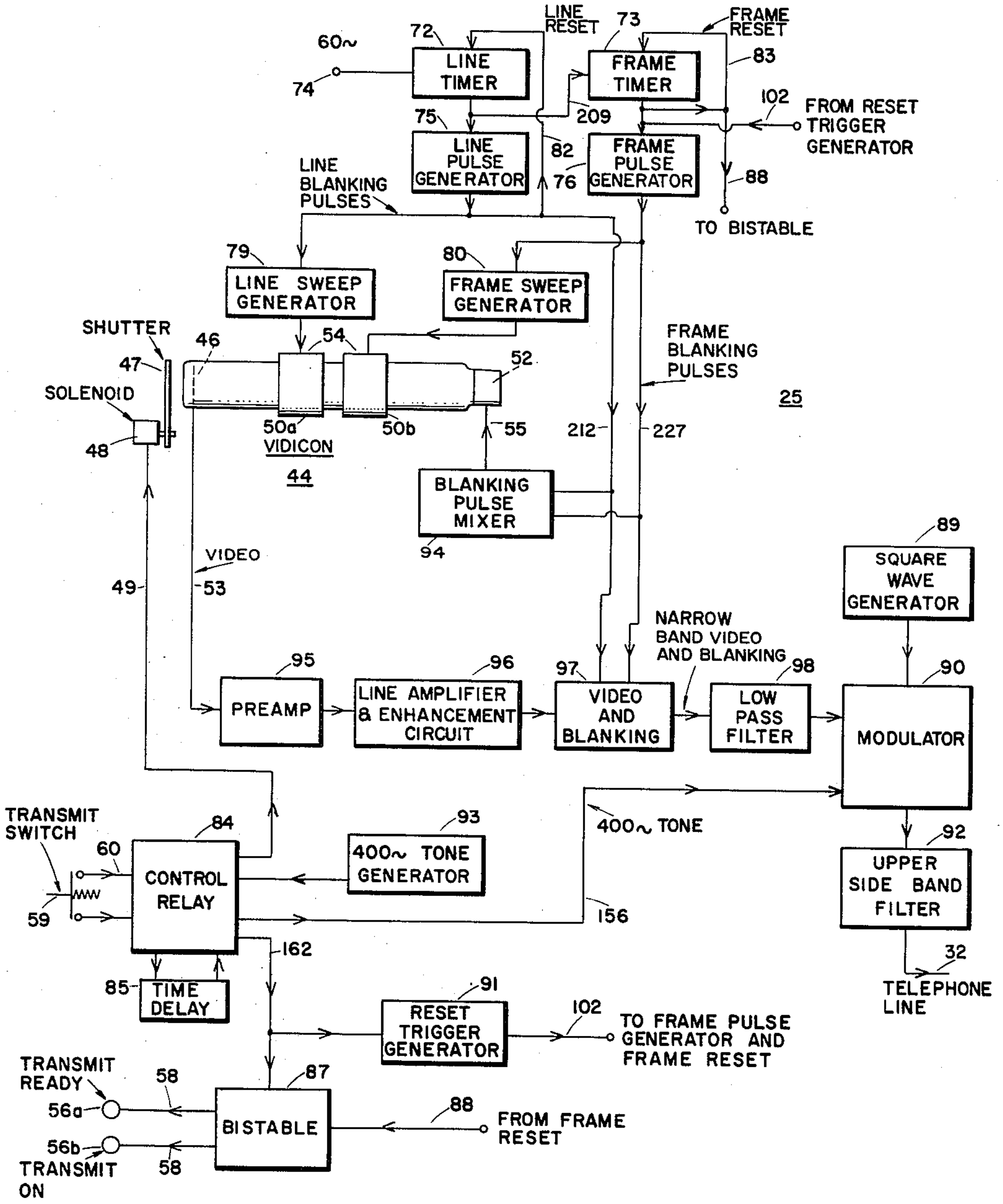
FIG. 2 is a schematic diagram generally showing the system of the transmitting station.
Figure 3:
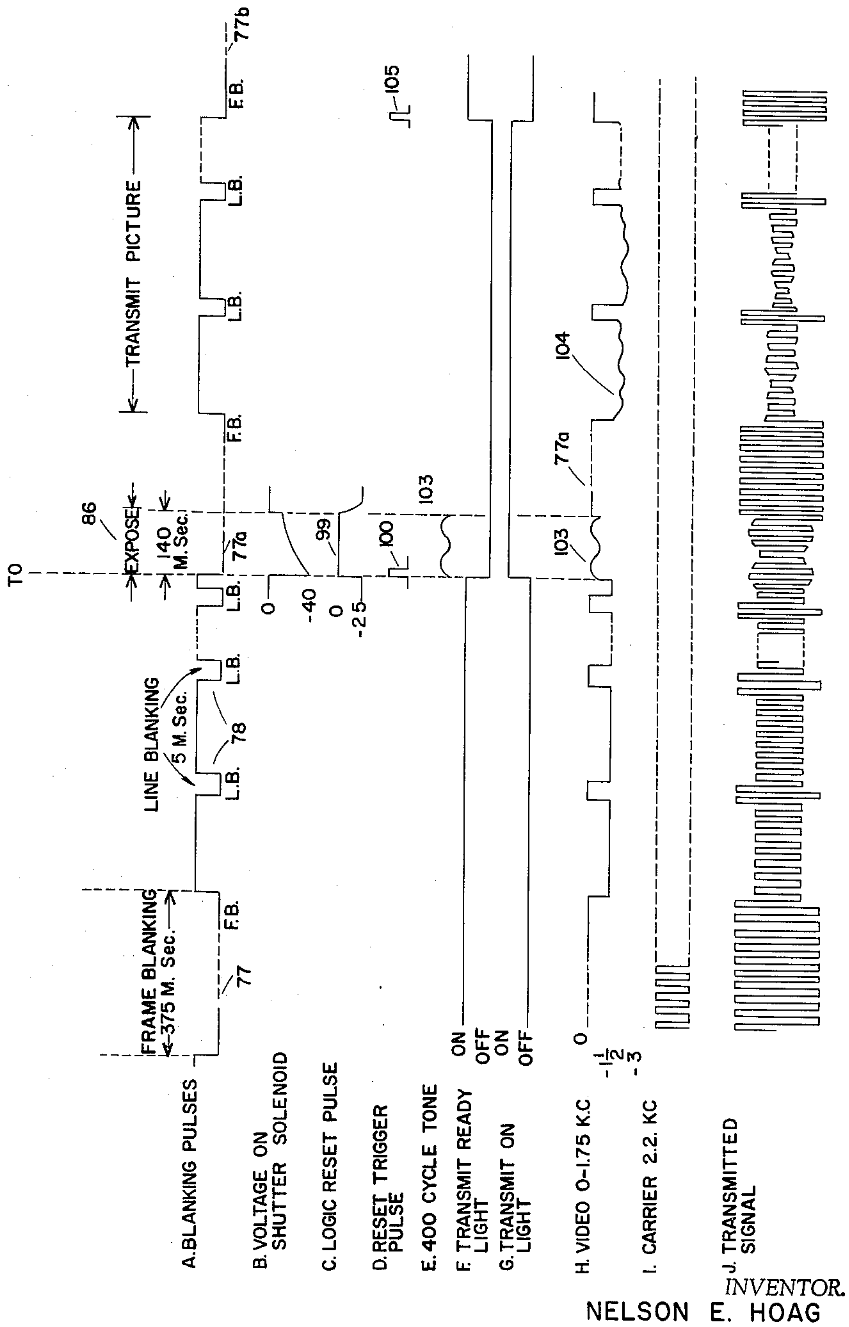
FIG. 3 is a diagram showing the wave forms employed in the transmitting portion of the system.
Figure 4:
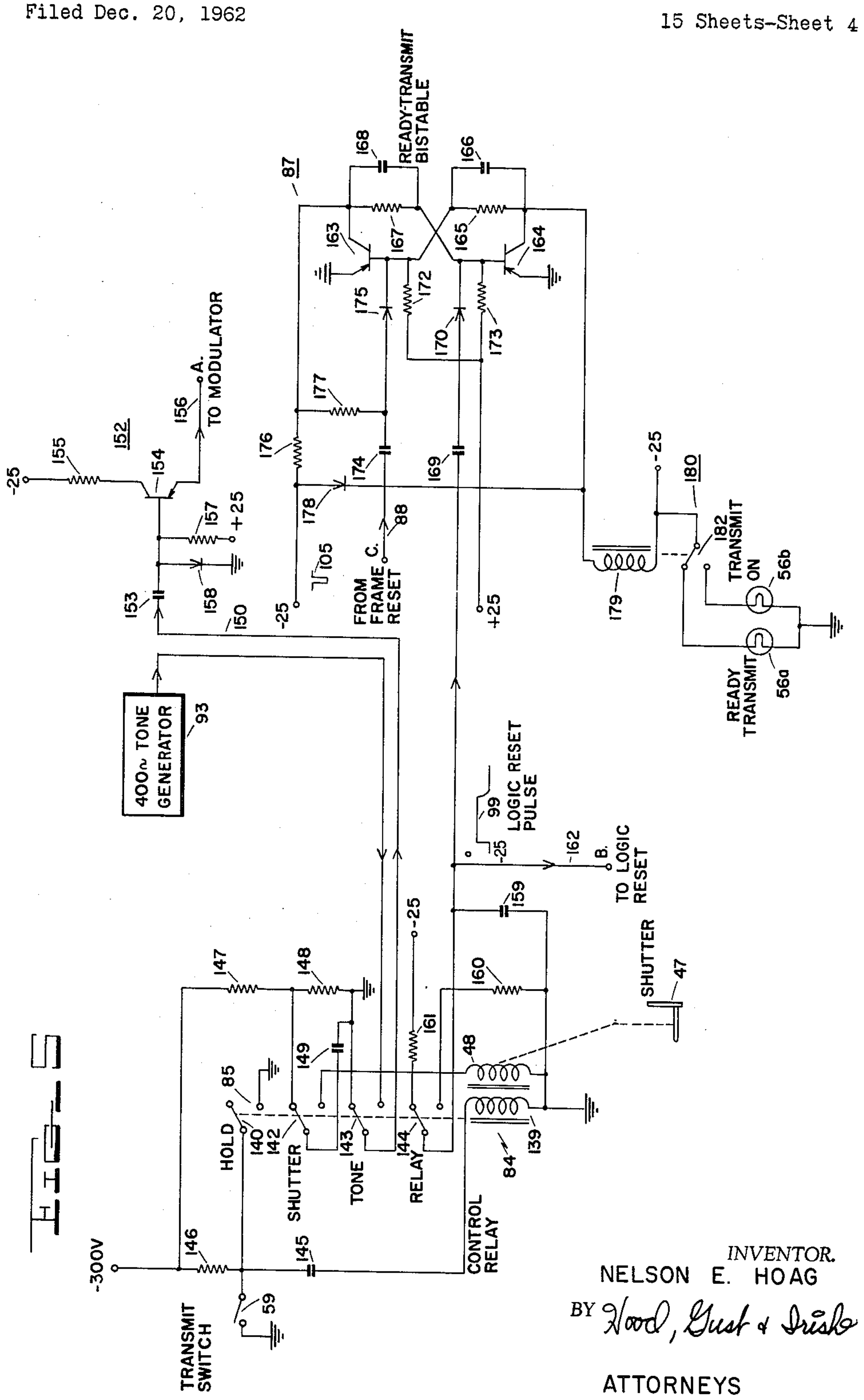

Referring now to FIGS. 2 and 3, there is shown a simplified block diagram of the transmitting station 25 together with the wave forms therein. Line and frame timers 72, 73, coupled to a suitable source of master timing signals, such as a 60-cycle source 74, are coupled respectively to line and frame pulse generators 75, 76 and normally continuously generate recurrent sequences of frame blanking pulses 77 and intervening line blanking pulses 78; in the illustrated embodiment, the frame blanking pulses have a duration of 375 millisecond and the line blanking pulses have a duration of 5 millisecond. As will be hereinafter described, the line and frame timers 72, 73 are arranged selectively to provide frame times of 10, 20, or 40 seconds respectively. The line and frame pulse generators 75, 76 are respectively coupled to line and frame sweep generators 79 and 80 which in turn are coupled to the deflection coils 50 and the vidicon 44.

A resetting circuit 82 couples the output of the line pulse generator 75 back to the line timer 72 in order to reset the same to count-down a new sequence of timing signals to provide a new line timing pulse. The frame timer 73 is coupled to the output circuit of the line timer 72 and thus the line timing pulses from the line timer 72 are counted-down by the frame timer 73 to provide the frame timing pulses. A resetting circuit 83 is provided for the frame timer 73 to reset the same so as to count down a new sequence of line timing pulses in response to the appearance of a frame timing pulse in the output circuit of the frame timer.

The operator, after placing the copy to be transmitted on the surface 35 of the enclosure 33, momentarily actuates the transmit switch 59 which energizes control relay 84. Control relay 84 includes a time delay or holding circuit 85 which maintains the relay energized for a predetermined period 86 (FIG. 3) which, in the specific embodiment, has a duration of 140 milliseconds. Relay 84, when energized, energizes solenoid 48 to actuate shutter 47 thereby to expose target electrode 46 of the vidicon 44 to the image of the copy reflected by mirror 39 through the lens 42. Thus, the target electrode of the vidicon is exposed to the optical image for the period 86 during which the control relay 84 is energized. The target electrode 46 of the vidicon 44 has storage capability and will thus retain the exposed image on the photoconductive surface until it is subsequently scanned off by the electron beam of the tube in the slow scan parameters as will be hereinafter described.

Control relay 84 is coupled to a reset trigger generator 91 which in turn is coupled to the frame pulse generator 76 and the frame reset circuit 83 by line 102. Energization of control relay 84 in response to momentary closing of transmit switch 59 thus causes the reset trigger generator 91 to generate a reset trigger pulse (in essence simulating a frame timing pulse from frame timer 73) which actuates frame pulse generator 76 to generate a new frame blanking pulse 77*a* (FIG. 3) and also resets the frame timer 73 to initiate a new count-down of line timing pulses from the line timer 72. Thus, momentary actuation of transmit switch 59 initiates a new sequence of frame and line blanking pulses.

Control relay 84 is also coupled to a bistable multivibrator 87 which alternately energizes the "transmit ready" pilot light 56*a* and the "transmit on" pilot light 56*b*. When the system is in a condition to receive and transmit a new picture, bistable multivibrator 87 is in one stable condition and energizes the "transmit ready" pilot light 56*a*. When control relay 84 is energized in response to momentary closing of transmit switch 59, bistable multivibrator 87 is switched to its other stable condition thereby turning off the "transmit ready" light 56*a* and turning on the "transmit on" light 56*b*, thus to indicate that transmission of a new picture is in process. Frame reset circuit 83 is coupled to the bistable multivibrator 87 by connection 88 so that the leading edge of the next frame blanking pulse 77*b* following the first frame blanking pulse 77*a* of the new sequence switches the bistable multivibrator 87 back to its first stable position thereby extinguishing the "transmit on" light 56*b* and again illuminating the "transmit ready" light 56*a* to indicate that a complete picture has been transmitted and that the system is now in condition to receive and transmit still another new picture.

A square wave generator 89 is provided for generating the square wave carrier signal, which in the specific embodiment has a frequency of 2.2 kc. A modulator 90, to be hereinafter more fully described, is provided for modulating the square wave carrier provided by the generator 89, the modulator 90 including means for cancelling the modulating signal component. The output circuit of the modulator is coupled to band pass filter 92 which removes the upper sideband component from the output of the modulator 90. The resultant transmission signal comprising the carrier and lower sideband components is coupled to a conventional 600 ohm voice band telephone line 32 for transmission to the receiving station 28. With this system, the telephone line 32 may be of any length from a few feet to thousands of miles.

A tone generator 93 is provided which, in the specific embodiment, provides a 400 cycle tone; the only requirement as to the frequency of the tone is that it be below the upper frequency of the video signal. Energization of control relay 84 couples the tone generator 93 to the modulator 90 during the period 86 so that the square wave carrier during that period is modulated by the 400 cycle tone.

The frame and line blanking pulses 77, 78 are non-additively mixed in mixer 94 and coupled to the electron gun 52 of the vidicon tube 44 for blanking the electron beam therein in response to each frame and line blanking pulse. The target electrode 46 of the vidicon tube 44 is coupled by connection 53 to a preamplifier circuit 95 which in turn is coupled to a color enhancement circuit 96 to be hereinafter more fully described. The frame and blanking pulses 77, 78 are inserted in the video signal by the video and blanking circuit 97 and the resulting narrow band viedo and blanking signal is passed through low pass filter 98 which passes the video frequency, i.e., 0 to 1.7 kc. to the exclusion of higher frequencies.

Referring specifically to FIG. 3A it will be seen that the recurrent sequences of frame blanking pulses 77 and intervening line blanking pulses 78 are continuously generated by the line and frame timers 72, 73 and the line and frame pulse generators 75, 76, however, that actuation of the transmit switch 59 at $T_0$ initiates period 86 and a new sequence of frame and line blanking pulses, the period 86 being shorter than a frame blanking pulse. FIG. 3B shows the voltage applied to the shutter solenoid 48 thereby actuating the same to expose the image to the target electrode 46 of the vidicon 44 during the period 86. FIG. 3C shows the logic reset pulse 99 applied to the reset trigger generator 91 by the control relay 84 during the period 86. The logic reset pulse 99 triggers the reset trigger generator 91 to generate reset trigger pulse 100 which is applied to frame pulse generator 76 by connection 102 thereby to initiate the new frame blanking pulse 77*a*, and to the frame reset circuit 83 to reset the frame timer 73.

In FIG. 3E, it is seen that the 400 cycle tone 103 is transmitted during the period 86 and in FIGS. 3F and G it is seen that the logic reset pulse 99 provided by the control relay 84 during the period 86 switches the bistable multivibrator 87 to turn the "transmit ready" light 56*a* OFF and the "transmit on" light 56*b* ON.

As will be hereinafter more fully described, the level of the video signal applied to the modulator 90 when no image is stored on the target electrode 46 of vidicon 44 which is being scanned by the electron beam thereof, is set by the video and blanking circuit 97 to 0 volts in the presence of a blanking pulse and minus 1½ volts in the absence of blanking pulses. Since the blanking pulses have been inserted in the video signal by the video and blanking circuit 97, and since the 400 cycle tone 103 is coupled to the modulator 90 during the first frame blanking pulse 77*a* of the new sequence, it will be seen in FIG. 3H that the 400 cycle tone is superimposed on the first frame blanking pulse 77*a*.

It will be seen that at the end of the period 86 provided by the time delay 85 of the control relay 84, an image is stored on the target electrode 46 of the vidicon 44, however, the scanning-off of the image by the electron beam does not start until the end of the first frame blanking pulse 77*a* since it will be recalled that the electron beam of the vidicon 44 is blanked-off by the frame blanking pulse 77*a*. It will also be understood that the line and frame sweeps for the electron beam of the vidicon tube 44 have been reset to their original positions during the first frame blanking pulse 77*a* of the new sequence initiated at $T_0$ so that scanning-off of the image stored on the target electrode 46 by the electron beam begins at the end of the first frame blanking pulse 77*a*. This provides a time-based video signal 104 in the intervals between line-blanking pulses 78 having a dark level of −1½ volts and a white level of −3 volts as set by the video and blanking circuit 97.

At the end of the new sequence of frame and line blanking pulses initiated at $T_0$, the frame timer 73 provides timing pulse 105 which is applied to the frame pulse generator 76 to generate the next frame blanking pulse 77*b* and is also applied to the frame reset circuit 83 to reset the frame timer 73. Frame reset pulse 105 is also applied by connection 88 to the bistable multivibrator 87 to switch the same to its initial stable position thereby to turn ON the "transmit ready" light 56*a* and to turn OFF the "transmit ON" light 56*b* as shown in FIGS. 3D, F, G, and H.

Referring now to FIGS. 3I and J, the square wave carrier provided by the square wave generator 89 is amplitude modulated by the balanced modulator 90 as shown in FIG. 3J, a 0 level video signal during the blanking pulses providing no modulation and the −3 volt white level video signal providing 100% modulation. Normal white level modulation is preferably held to 35% to minimize 2nd order distortion in the output.

Figure 11:
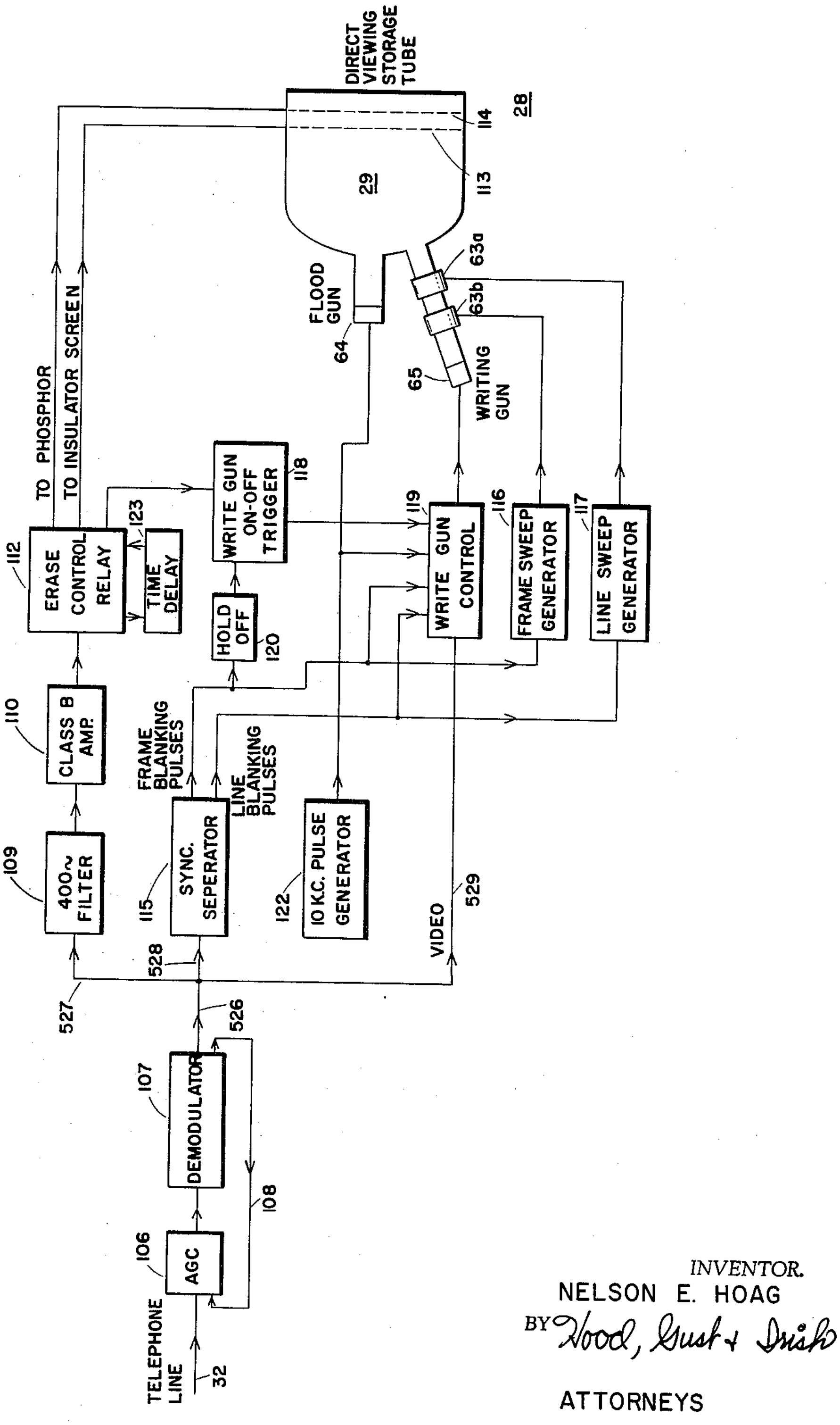
FIG. 11 is a schematic diagram generally illustrating the system of the receiving station of FIG. 1.

Turning now to FIG. 11 which is a simplified block diagram of the receiver 28, and to FIG. 16 which shows the wave forms in the receiver, an automatic gain control circuit 106 is provided which receives the signal transmitted over the telephone line 32. The AGC circuit 106 is coupled to the demodulator 107, a portion of the recovered signal being fed back to the AGC circuit 106 by connection 108; the AGC circuit 106 and demodulator 107 will be hereinafter more fully described.

The 400 cycle tone, after being detected as a part of the narrow band video in the receiver, is filtered out by a very narrow band pass filter 109, is amplified in amplifier 110, and employed to energize erase control relay 112. Erase control relay 112 is coupled to the storage electrode or insulator 113 of storage tube 29 and when energized, applies the proper potential to the insulator 113 to erase a previously stored image therefrom. Erase control relay 112 is also coupled to the display screen or phosphor 114 of storage tube 29 and when energized, disconnects the high voltage power supply therefrom.

A synchronizing pulse separator circuit 115 receives the frame and line blanking pulses after detection as a part of the narrow band video signal and separates the blanking pulses therefrom, as will be hereinafter described. The sync. separator 115 is coupled to the frame and line sweep generators 116, 117, which in turn are coupled to the deflection coils 63 for the writing gun 65 of the storage tube 29. The erase control relay 112 is coupled to trigger a bistable multivibrator 118 to one of its stable conditions in response to energization of the relay 112. The bistable multivibrator or "write gun ON-OFF trigger" 118 is in turn coupled to the writing gun control circuit 119 to actuate the writing gun 65 of the storage tube 29. The frame blanking pulses separated by the sync. separator 115 are coupled to the ON-OFF trigger 118 through a hold-off circuit 120 so that the trailing edge of frame blanking pulse 77*b* following the first frame blanking pulse 77*a* of the new sequence initiated at $T_0$ switches the ON-OFF trigger 118 to its other stable condition thereby to actuate the writing gun control 119 to turn off the writing gun 65. The frame and line blanking pulses from the sync. separator 115 are also coupled to the writing gun control 119 to turn off the writing electron beam during each blanking pulse.

In order to provide for storage of the transmitted picture on the display screen 114 of the storage tube 29 for an appreciable length of time following completion of the transmission of a picture, i.e., one frame, a pulse generator 122 is provided coupled respectively to the flood gun 64 of the storage tube 29 and to the write gun control 119 to pulse the writing electron beam and the flood electron beam alternately on and off at a frequency substantially higher than any other frequency employed in the system; in this specific embodiment, pulse generator 122 provides pulses having a frequency of 10 kc.

It will now be seen that the 400 cycle tone 103 is transmitted at the beginning of a new picture transmission, i.e., is superimposed upon the first frame blanking pulse 77*a* of the new sequence of frame and line blanking pulses initiated by actuation of transmit switch 59, whereas actual picture transmission does not begin until the end of the first frame blanking pulse 77*a*, erasure of a previously stored picture being accomplished just prior to transmission of a new picture and writing the same onto the insulator 113 of the storage tube 29. It will also be understood that since the first frame blanking pulse 77*a* of the new sequence is received simultaneously with the 400 cycle tone 103, the sweep circuits 116 and 117 of the storage tube 29 are returned to their respective starting positions so that at the end of the first frame blanking pulse 77*a* of the new sequence, the sweep circuits of both the vidicon 44 and the storage tube 29 are in their starting positions for respectively scanning-off the video signal of the target electrode 46 of the vidicon 44 and for simultaneously writing the same onto the insulator 113 of the storage tube 29 during the remainder of the frame initiated at $T_0$.

Erase control relay 112 is provided with a time delay 123 for maintaining the same energized for a period longer than the duration of the 400 cycle tone but less than the duration of the first blanking pulse 77*a* and thus, the erase control relay 112 is energized for the period 576 shown in FIG. 16B. As indicated, energization of the erase control relay 112 actuates the write gun ON-OFF trigger 118 to in turn actuate the writing gun control 119 to turn on the writing gun 65 whereas the trailing edge of the frame blanking pulse 77*b* following the first frame blanking pulse 77*a* actuates the trigger circuit 118 and the writing gun control 119 to turn off the writing gun 65 as shown in FIG. 16C. It will be seen in FIG. 16D that an erasing potential of +5 volts is applied to the insulator 113 of the storage tube 29 during the period when the erase control relay 112 is energized. It will likewise be seen in FIG. 16E that the high voltage applied to the display screen 114 of the storage tube 29 is disconnected therefrom during the period 576 when the erase control relay 112 is energized in order to prevent a momentary flash of light on the screen when the reading gun 64 is turned on. The blanking of the writing gun 65 by the frame and line blanking pulses is shown in FIG. 16F. The alternate ON and OFF pulsing of the reading or flood gun 64 and the writing gun 65 of the storage tube 29 by the pulse generator 122 is shown in FIGS. 16G and H.

It will now be seen that when the transmit switch 59 at the transmitting station 25 is actuated at $T_0$, if a previously stored picture is still persisting, it is erased from the storage tube 29 at the receiving station 28, and that a new picture is written into the storage tube during one frame, the writing gun 65 being turned off at the end of the one picture-transmitting and writing frame, but the picture being stored and thus displayed on the display screen 114 for a period as long as 8 minutes following the one frame in which it was transmitted and written into the storage tube. However, immediately upon completion of the one frame transmission and writing period initiated at $T_0$, i.e., at $T_1$, the "transmit ready" light 56*a* at the transmitting station 25 is illuminated and a new picture may be transmitted at any time thereafter; if, as above described, the transmit switch 59 is actuated to transmit a new picture during the 6 to 8 minutes persistence period of a previously transmitted picture, that picture is erased to permit writing in of the new transmitted picture in the storage tube 29.

Figure 4:
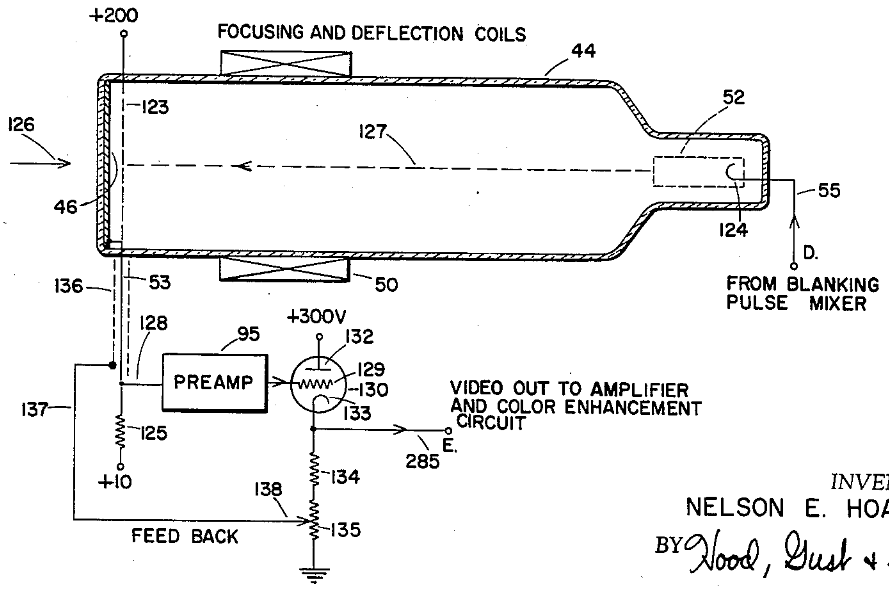
FIG. 4 is a diagram schematically showing the image tube and associated circuitry of the system of FIG. 2.

Turning now to FIG. 4, the vidicon tube 44 includes a collector screen 123 adjacent the photoconductive target electrode 46 and connected to a suitable source of potential such as +200 volts. Electron gun 52 includes a cathode 124 coupled to the blanking pulse mixer 94 by lead 55 for receiving the frame and line blanking pulses therefrom, and also conventional beam forming and accelerating electrodes (not shown), for providing the electron beam 127 which is scanned over the target electrode 46 by the deflection coils 50. The photoconductive target electrode 46 is connected to a suitable source of potential, such as +10 volts by load resistor 125 and lead 53. As indicated, employing selenium for the photoconductive surface of the target electrode 46 instead of the conventional antimony trisulphide, increases the storage time of the target electrode sufficiently to permit scanning-off of the stored image with the slow scan paramater employed in the system. It will be understood that the target electrode 46 is normally dark except during the period 86 when the solenoid 48 is energized to actuate shutter 47 thus exposing target electrode 46 to an image from lens 42 as indicated by arrow 126. It will be observed that the electron beam 127 provided by the electron gun 52 is continuously scanned over the surface of the target electrode 46 thus bringing the surface of the photoconductor to cathode potential, i.e., to ground.

When the target electrode 46 is exposed to light by the shutter 47, the electron beam 127 being blanked off during the period of exposure as above described, the areas of the target electrode which are exposed to light discharge toward the target voltage. Thus, when scanning of the target electrode by the electron beam 127 is resumed following the end of the first frame blanking pulse 77*a* of the new sequence, the amount of beam current flowing in the load resistor 125 to restore the potential of the photoconductive surface to cathode potential provides the time-based video signal. The employment of the conventional antimony trisulphide for the photoconductive surface 46 would provide an excessive "dark current," i.e., leakage current with the target electrode dark, with the result that no signal would remain at the slow scanning rates employed in this system.

Preamplifier 95 which may have any conventional circuit configuration, has its input circuit 128 coupled to the end of load resistor 125 to which the lead 53 is connected. The output circuit of preamplifier circuit 95 is coupled to the control grid 129 of a triode tube 130 having its plate 132 coupled to a suitable source of potential, such as +300 volts and having its cathode 133 coupled to ground by resistor 134 and potentiometer 135. Cathode 133 of tube 130 is coupled to the input circuit of the line amplifier and color enhancement circuit 96, thus providing a conventional cathode-follower connection.

A metalic shield 136 surrounds the target electrode lead 53 in order to prevent pickup of stray signals, however, the distributed capacitance of the shield 136, the target electrode 46, and elsewhere in the circuit, shunts the load resistor 125 thus reducing the high frequency response of the system. Since it is desirable that the response of this portion of the system be flat to a frequency of 2 kc., i.e., above the maximum video frequency of 1.75 kc., it is necessary to compensate for this distributed capacitance. This is accomplished by providing a feed-back connection 137 from the end of the shield 136 adjacent the load resistor 125 to the movable element 138 of the potentiometer 135. Thus, by providing a positive feedback connection from the shield 136, the high frequency end of the video pass band may be controlled.

Referring now to FIG. 5, control relay 84 comprises an operating coil 139 and four contacts 140, 142, 143, and 144 actuated thereby between first positions when coil 139 is de-energized, as shown in FIG. 5, and second positions when the coil is energized. Operating coil 139 has one end connected to ground and its other end connected to a suitable source of potential, such as −300 volts by capacitor 145 and resistor 146. It will thus be seen that capacitor 145 is normally charged to −300 volts through resistor 146 at a rate insufficient to pull in control relay 84. Transmit switch 59, when momentarily actuated, shorts capacitor 145 to ground thus causing it to discharge through coil 139 to energize the same thus moving contacts 140, 142, 143, 144 to their second positions. Contact 140 is a holding contact which, in its second position, connects capacitor 145 to ground despite release of transmit switch 59. Capacitor 145 thus continues to discharge until coil 139 is de-energized restoring the contacts 140–144 to their first positions, thus establishing the period 86. It will thus be seen that capacitor 145, the resistance of control relay 84 and the holding contacts 140 comprise the time delay circuit 85 for the control relay 84.

The shutter actuating solenoid coil 48 has one end connected to ground and its other end connected to the normally open side of contact 142 of control relay 84. Resistors 147 and 148 are connected between the −300 volt source and ground. Contact 142 in its normally closed position, i.e., when operating coil 139 of control relay 84 is de-energized, couples capacitor 149 across resistor 148 so that capacitor 149 is normally charged to the voltage drop across resistor 148. When coil 139 of control relay 84 is energized as above-described, contact 142 connects capacitor 149 to discharge through shutter actuating solenoid coil 48 thus energizing the solenoid coil and actuating shutter 47, the voltage provided on the solenoid coil 48 by discharge of capacitor 149 therethrough being shown in FIG. 3B. This arrangement is provided in the illustrated embodiment in order to provide the heavy current necessary for energizing the solenoid coil 48 to provide the requisite fast operation of the shutter 47.

The 400 cycle tone generator 93, which may comprise a conventional reed relay with suitable amplification, is coupled to the normally open position of contact 143 of control relay 84. Contact 143 in its normally closed position grounds the input circuit 150 of emitter follower 152 and when operating coil 139 is energized, couples the 400 cycle tone generator 93 thereto. Emitter follower 152 comprises capacitor 153 coupling the input circuit 150 to the base of transistor 154 which has its collector coupled to a suitable source of potential, such as −25 volts by resistor 155 and which has its emitter coupled to low pass filter 98 by connection 156 as will be hereinafter described; resistor 358 (FIG. 8) is the emitter resistor. The base of transistor 154 is also connected to a source of +25 volt potential by resistor 157 and a diode 158 is connected between the base and ground, as shown. Diode 158 and resistor 157 normally bias transistor 154 OFF in the absence of the input 400 cycle tone, diode 158 clamping the most positive excursion of the 400 cycle wave form to ground causing it to swing negative from ground so that the output signal in line 156 goes negative and is thus at the proper direct current potential level for the modulator.

Contact 144 of control relay 84 in its normally closed position couples capacitor 159 to a source of −25 volts through resistor 161. Capacitor 159 thus is charged to −25 volts when operating coil 139 of relay 84 is de-energized. When coil 139 is energized, contact 144 connects line 162 to ground through resistor 160. Capacitor 159 is a relatively large capacitor and is thus immediately discharged so that the potential of line 162 immediately rises to 0 to provide the logic reset pulse 99.

The ready-transmit bistable multivibrator 87 comprises transistors 163 and 164 with the base of transistor 163 connected to the collector of transistor 164 by resistor 165 and capacitor 166 and with the base of transistor 164 connected to the collector of transistor 163 by resistor 167 and capacitor 168. Line 162 from the reset contact 144 of relay 84 is coupled to the base of transistor 164 by capacitor 169 and diode 170. A source of +25 volt potential is connected to the base of transistor 163 and the base of transistor 164 by resistors 172 and 173 respectively. Frame reset pulses 105 from the frame reset circuit 83 are connected by line 88 to the base of transistor 163 through capacitor 174 and diode 175. The collector of transistor 163 is connected to a source of −25 volt potential by resistor 176 and resistor 177 is connected between the collector of transistor 163 and a point between capacitor 174 and diode 175. Diode 178 protects transistor 164 from switching transients due to relay coil 179. The emitters of both transistors are grounded, as shown.

The above described circuit of bistable multivibrator 87 is conventional, and other conventional bistable multivibrator circuits may be substituted therefor, however, it will be observed that the collector of transistor 164 is coupled to a source of −25 volt potential through operating coil 179 of relay 180. Contact 182 of relay 180 in its closed position, i.e., with coil 179 energized, energizes "ready transmit" pilot light **56*a* and when coil 179 is de-energized, contact 182 energizes "transmit ON" pilot light 56*b***.

It will be readily seen that in the normal stable or stand-by state of bistable multivibrator 87, coil 179 of relay 180 is energized so that contact 182 energizes "ready transmit" pilot light **56*a*. When coil 139 of relay 84 is de-energized, responsive to momentary actuation of transmit switch 59, as above-described, the positive-going leading edge of the logic reset pulse 99 switches the bistable multivibrator 87 to its other stable condition de-energizing coil 179 of relay 180 and causing contact 182 to extinguish pilot light 56*a* and to illuminate the "transmit ON" pilot light 56*b*. It will further be seen that timing pulse 105 from frame timer 73 which initiates the next frame blanking pulse 77*b* will again switch bistable multivibrator 87 back to its first stable position thus energizing operating coil 179 of relay 180 and causing contact 182 to extinguish the "transmit ON" pilot light 56*b* and again to illuminate the "ready-transmit" pilot light 56*a***.

Referring now to FIG. 6, line timer 72 comprises a bistable counting chain having three conventional bistable multivibrator or flip-flop circuits 183, 184 and 185, flip-flop circuit 183 being connected to the 60 cycle source of timing signals 74 by a conventional squaring circuit 186. The flip-flops 183, 184, and 185 are serially connected so as to count-down the squared 60 cycle timing signal, as is well known.

Each of the three flip-flops 183, 184, and 185 has a timing pulse pick-off circuit 187, 188, and 189 selectively coupled to diode logic circuit 190 comprising diodes 192, 193, and 194 by a scan rate selector switch 195 for selectively providing the 10, 20, or 40 second frame rate.

The output circuit 197 of the logic circuit 190 is coupled to the base of transistor 198 by diode 199. The base of transistor 198 is connected to a source of +25 volt potential by resistor 200 and to a source of −25 volt potential by resistor 202 and diode 199. A capacitor 203 couples the base of transistor 198 to ground. The collector of transistor 198 is connected to the source of −25 volt potential by resistor 204 and to ground by a zener diode 205, the emitter being grounded as shown.

When the flip-flops 183, 184, 185 are initially reset to initiate a new count-down operation, those of the diodes 192, 193, and 194 which are connected in the logic circuit by the particular position of scan rate selector switch 195 are grounded thus placing the base of transistor 198 slightly positive so that transistor 198 is cut-off. Therefore, the potential level in the output circuit 206 connected to the collector of transistor 198 will, by virtue of the zener diode 205 be −5 volts. As the count in the respective output circuits 187, 188, and 189 of the flip-flops 183, 184, 185 is impressed upon the diodes 192, 193, 194, depending upon the position of switch 195, the desired predetermined pulse count is reached when the connected logic diodes are back-biased negatively thereby opening the connection 197 so that the base of transistor 198 assumes the potential provided by the voltage divider formed of resistor 200, diode 199 and resistor 202. Under these conditions, the base of transistor 198 goes sufficiently negative to turn on transistor 198 thus providing ground or 0 voltage potential at the collector to provide the positive-going line timing pulse 207 in the output circuit 206. Capacitor 203 is provided in order to short-circuit any switching transients involved in the operation of the logic diodes 192, 193, 194.

The positive-going line timing pulses 207 are coupled to the frame timer 73 by connection 209 and also to a conventional stretching and inverting circuit 210 by capacitor 208. Stretching and inverting circuit 210 provides the negative-going 5 millisecond line blanking pulses 78 in its output circuit 212. Output circuit 212 of the stretching and inverting circuit 210 is coupled to the video and blanking circuit 97, to the line sweep generator 79, and to the line reset circuit 82 for the flip-flops 183, 184, and 185 by differentiating circuit 211, 213 which provides the requisite positive-going pulse to reset the line timer flip-flops.

The line timing pulses 207 in line 209 are coupled to a bistable counting chain 214 of frame timer 73 which, in the illustrated embodiment, comprises ten conventional flip-flop circuits for counting-down the line timing pulses 207. The pulse pick-off circuits of all but the first two flip-flops 214 are selectively coupled to diode logic circuit 215 by scan rate selector switch 195 to provide the desired 10, 20 or 40 second frame rates. The output circuit 216 of the diode logic circuit 215 is coupled to the base of transistor 217 by diode 218, the base of transistor 217 being connected to a source of +25 volt potential by resistor 219 and to a source of −25 volt potential by diode 218 and resistor 220. Capacitor 222 couples the base of transistor 217 to ground. The collector of transistor 217 is coupled to the source of −25 volt potential by resistor 223 and to ground by zener diode 224, the emitter being grounded as shown.

The operation of the circuit of transistor 217 is identical to that of the circuit of transistor 198, above described. Thus with one of more of the diodes 215 coupled to ground, the potential level in the output circuit 226 of transistor 217 is at a potential of −5 volts, however, when the predetermined pulse count is reached, as determined by the position of scan rate selector switch 195, all of the diodes 215 are either negatively back-biased or floating, so that transistor 217 is turned on to provide the positive-going frame timing pulse 225 in the output circuit 226.

The positive-going frame timing pulse 225 is coupled to the frame blanking pulse generator 76 which generates the negative-going 375 millisecond frame-blanking pulse 77 in its output circuit 227. The output circuit 227 of the frame-blanking pulse generator 76 is coupled to the frame sweep generator 80 and to the video and blanking circuit 97.

The frame timing pulse 225 is also inverted in conventional inverting circuit 228 to provide the negative-going frame reset pulse 105. After differentiation, the output circuit 88 of the inverting circuit 228 is coupled to the frame reset circuit 83 for the flip-flops of the counting chain 214 and also by line 88 to the ready-transmit bistable multivibrator 87 (FIG. 5).

Line 162 from the reset contacts 144 of the control relay 84 is coupled to the base of transistor 229 by a coupling capacitor 230. Transistor 229 has its emitter connected to ground by resistor 232 and its collector is connected to a −25 volt potential by resistor 233, the base being likewise connected to the source of −25 volt potential by resistor 234. The collector of transistor 229 is connected to ground by zener diode 235 and to the base of transistor 217 by coupling capacitor 236.

Transistor 229 is normally conducting thus providing a potential level in its output circuit 237 of approximately 0 volts. However, the application of the positive-going logic reset pulse 99 on the base of transistor 229 from line 162 turns transistor 229 OFF thus providing a potential level of −5 volts at its output circuit 237 by virtue of the zener diode 235, in turn providing the negative-going pulse 231 which is applied to the base of transistor 217 through coupling capacitor 236 which turns transistor 217 ON as above described, to provide a new frame timing pulse 225. It is thus seen that the frame timing pulse 225 which initiates the new frame blanking pulse **77*a* and also resets the flip-flops of the bistable counting chain 214 of the frame timer 73 is provided either in response to completion of a predetermined count-down of line timing pulses by the counting chain 214, or by the application of a logic reset pulse 99 to reset trigger generator 91 comprising the transistor 229** and its associated circuitry.

Figure 10:
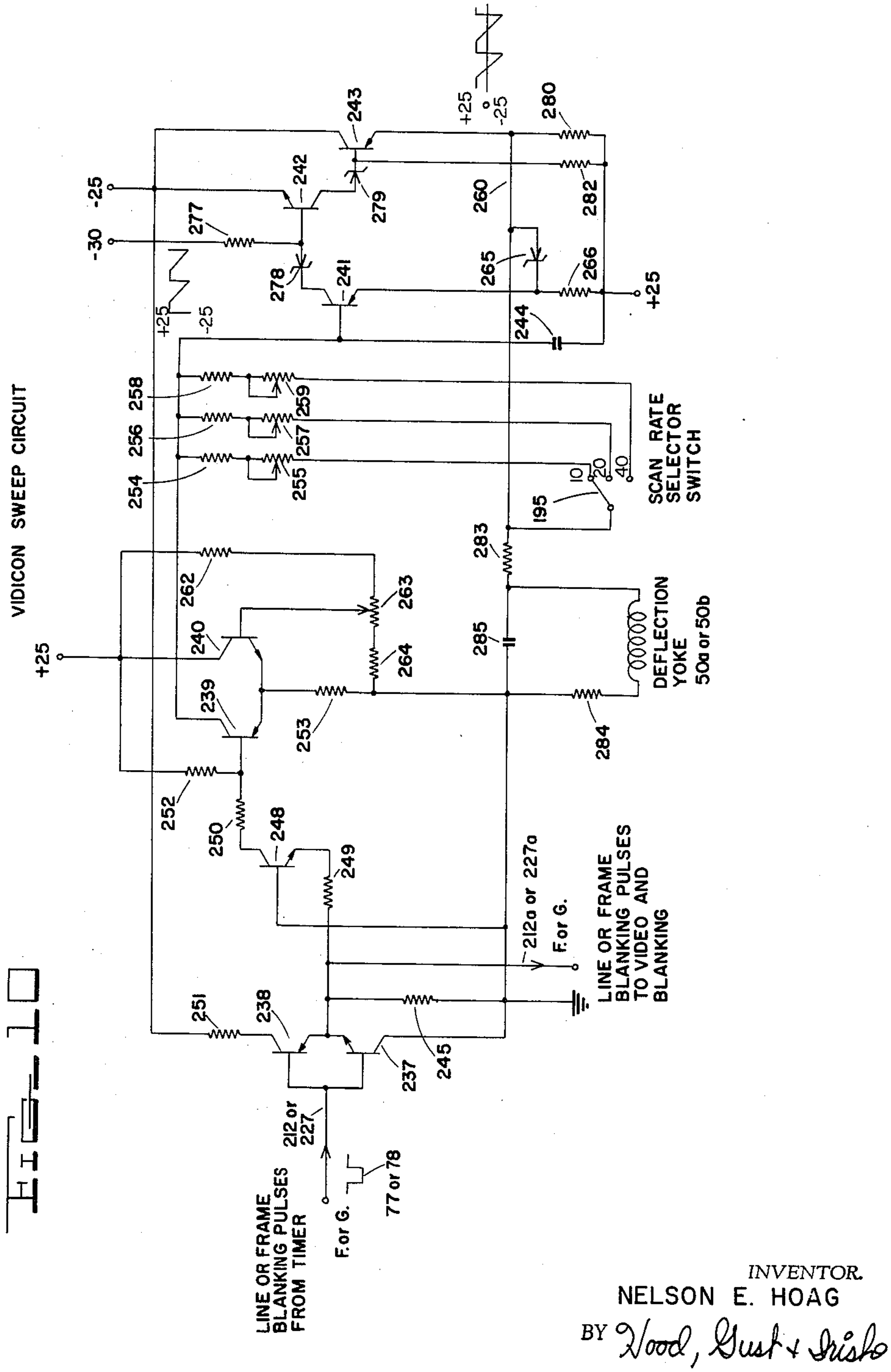
FIG. 10 is the schematic illustration of a sweep generating circuit of FIG. 2.

Referring now to FIG. 10, there is shown the circuit of the line and frame sweep generators, 79, 80, the two circuits differing essentially only in the resistance and capacitance values necessary to provide the two different sweep rates. Here, output circuit 212 or 227 from the line or frame pulse generator 75 or 76, as the case may be, is coupled to the bases of transistors 237 and 238 connected in a complementary emitter follower configuration. The emitters of transistors 237, 238 are connected together and to ground by load resistor 245, the collector of transistor 237 is connected to ground and the collector of transistor 238 is connected to a source of −25 volt potential. It will be seen that the occurrence of the negative-going line or frame blanking pulse 77 or 78 will turn transistor 237 OFF and turn transistor 238 ON to provide a negative-going pulse across resistor 245. Output circuit **212*a* in the case of line blanking pulses, or 227*a* in the case of frame blanking pulses is connected to the emitters of transistors 237, 238 and to the video and blanking circuit 97**, as will be hereinafter described.

The emitters of transistors 237, 238 are connected to the emitter of transistor 248 by resistor 249, transistor 248 having its base connected to ground and its collector connected to a source of +25 volt potential by resistors 250 and 252. The negative-going pulse across resistor 245 thus turns transistor 248 ON to impress a negative-going pulse upon the base of transistor 239 in turn turning it ON. The emitter of transistor 239 is connected to ground by resistor 253 and its collector is connected to the base of transistor 241 and to one side of sweep capacitor 244, which has its other side connected to a source of +25 volt potential. The collector of transistor 239 is also connected to the serially connected pairs of charging resistors 254 and 255, 256 and 257, and 258 and 259 which are selectively connected to line 260 by scan rate selector switch 195.

Transistor 240 has its emitter connected to the emitter of transistor 239 and its base connected to a voltage divider comprising a resistor 262, potentiometer 263 and resistor 264 connected between the source of +25 volt potential and ground. The conduction through transistor 240, and thus the potential of its emitter and the emitter of transistor 239 is established by adjustment of potentiometer 263 which provides the centering control for the resultant sweep.

Assuming that the sweep capacitor 244 is fully charged to a potential more negative than +25 volts as will hereinafter be described, impression of the negative-going pulse upon the base of transistor 239 turns that transistor ON and connects sweep capacitor 244 to the potential established at the emitter of transistor 239, which will approach the +12 volt potential, and sweep capacitor 244 will thus immediately be discharged to that potential. Upon termination of the line or frame blanking pulse as the case may be, transistor 239 is turned OFF.

It will be observed that line 260 is connected to the +25 volt potential by zener diode 265 and resistor 266 thus establishing a potential level on line 260 at the end of a blanking pulse which is approximately 5 volts below the +12 volt potential. Upon termination of the blanking pulse, capacitor 244 charges through the particular pair of charging resistors selected by scan rate selector switch 195 to the potential thus established on line 260, thus impressing a negative-going saw-tooth potential on the base of transistor 241 which is thus rendered increasingly more conductive. The emitter of transistor 241 is connected to the +25 volt source of potential by resistor 266 and its collector is connected to a source of −30 volt potential by resistor 277 and zener diode 278 which also connects the collector of transistor 241 to the base of transistor 242. Likewise, the potential of approximately −25 volts established by zener diode 278 is impressed upon the base of transistor 242 during a blanking pulse. Increase conduction of transistor 241 responsive to charging of capacitor 244 increases the potential applied to the base of transistor 242 in saw-tooth fashion thus causing that transistor to conduct more current. The emitter of transistor 242 is connected to the source of −25 volt potential while the selector is connected to the base of transistor 243 by zener diode 279. The collector of transistor 243 is connected to the source of −25 volt potential and its emitter is connected to line 260 and to the source of +25 volt potential by resistor 280. The base of transistor 243 is also connected to the source of +25 volt potential by resistor 282.

Thus it can be seen that transistors 241, 242, and 243 with their associated resistors and diodes form a direct coupled feed back amplifier. As a negative-going saw-tooth potential is applied to the base of transistor 243 responsive to charging of capacitor 244, the conduction of transistor 243 increases thus reducing the potential of its emitter in line 260 in saw-tooth fashion toward −25 volts. At this point, it will again be observed that the charging resistors 254–259 for capacitor 244 are connected by scan rate selector switch 195 to line 260 and thus the potential to which capacitor 244 is charged is boot-strapped at a constant charging voltage of 5 volts due to zener diode 265.

Line 260 is connected to the respective deflection yoke 50A or 50B by resistor 283 and the deflection yoke is then connected to ground by resistor 284 with capacitor 285 coupled across resistor 284 and the deflection yoke.

It will be observed that during blanking, substantially all of the deflection yoke current flows through resistor 280, the electron beam of the vidicon tube 44 dwelling at one side of the tube in this condition. As the current flowing through transistor 243 and resistor 280 increases as capacitor 244 charges, the potential of line 260 decreases linearly to 0 and continues to increase linearly toward −25 volts, the deflection yoke current thus in turn decreasing linearly toward 0 and increasing linearly to its opposite maximum before the next blanking pulse. Potentiometer 263 sets the discharge level of the charging capacitor 244 and therefore the resultant deflection yoke current at the beginning of the sweep. Potentiometer 263 thus sets the position of the sweep start and is used as the beam centering control.

It will be observed that direct-coupled sweep amplifiers are used by virtue of the very low sweep rates employed, thus accurately controlling the resulting operating point drift. It will be seen that the maximum amount of exponential charge of the sweep capacitor 244 is employed, followed with minimum over-all gain and maximum over-all feed-back to provide maximum linearity and drift stability.

Figure 7:
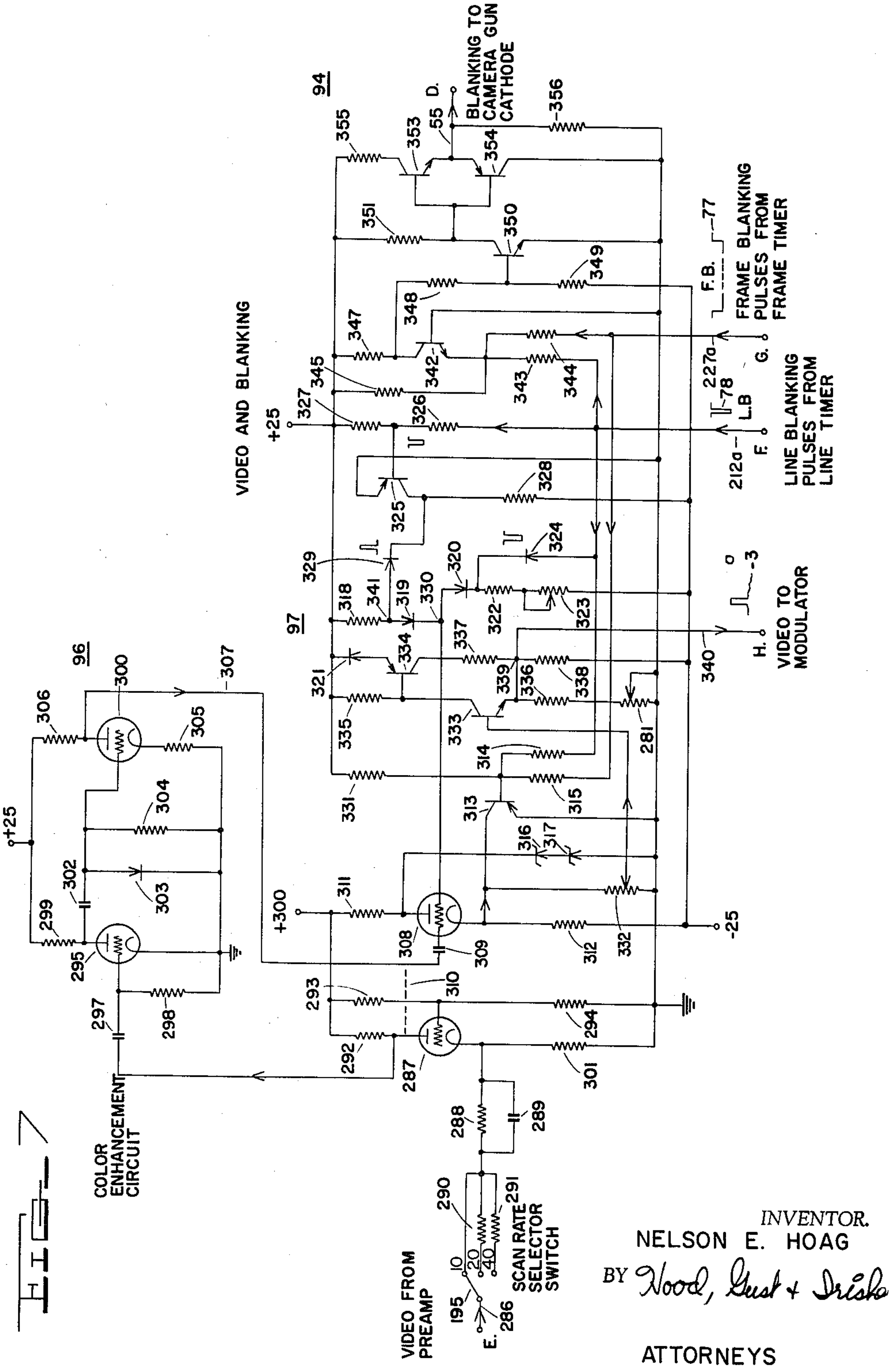
FIG. 7 is a schematic illustration of the color enhancement circuit and the video and blanking circuit of the transmitting system.

Turning now to FIG. 7, the video signal from the preamplifier 95 on line 286 as applied by scanning rate selector switch 195 to the cathode of tube 287 through resistor 288 and capacitor 289, and also through either resistor 290 or resistor 291 in the 20 or 40 second frame rate positions of switch 195. The cathode of tube 287 is grounded and the plate is connected to a source of +300 volt potential by load resistor 292, bias for its control grid being provided by a voltage divider comprising resistors 293 and 294. The plate of amplifier tube 287 is coupled to the control grid of triode 295 of the color enhancement circuit 96 by coupling capacitor 297.

All vidicon image tubes are sensitive to variations in background color. For example, the WL7290 vidicon employed in the specific embodiment has a peak sensitivity in the blue region (4000 to 5000 A.), and the relative response outside of these limits drops off rapidly. For example, for yellow (6000 A.) the relative response is only about 5%. Since the information to be transmitted by the system of the invention may be recorded on cards or papers of different color and also since the color of the ink used on different documents varies, the color enhancement circuit 96 is provided in order to overcome the deficiencies of the vidicon 44 to provide a readable display.

Tube 295 is a high gain amplifier and inverter and has its cathode connected to ground and its grid connected to ground by resistor 298 with its plate being connected to a source of +25 volt potential by resistor 299. The plate of tube 295 is coupled to the grid of triode 300 by coupling capacitor 302. The video signal which appears at the grid of tube 300 thus has a positive polarity for "white" and a negative polarity for "black"; the white level of the video signal is assumed to be the background color of the image being transmitted. Diode 303 clamps the grid of tube 300 to ground. Resistor 304 also couples the grid of tube 300 to ground, its cathode is connected to ground by resistor 305 and its plate is connected to the +25 volt potential source by resistor 306. The output circuit 307 of the enhancement circuit 96 is coupled to the plate of tube 300.

With the "white" level video signal thus clamped to ground by diode 303, the bias on the grid of tube 300 is set so that the negative-going video signal is clipped at about −1 volt level. The cathode and plate resistors 305 and 306 are equal in value thereby making the gain of the stage one, and the desired video signal thus appears as a negative-going signal from ground on line 307.

The enhancement circuit 96 is more fully described in application Serial No. 246,198 filed December 20, 1962, now Patent No. 3,204,027, of L. E. Clements, assigned to the assignee of the present application.

Output circuit 307 from the enhancement circuit 96 is coupled to the grid of tube 308 by coupling capacitor 309. At this point it is to be observed that in the event that color enhancement is not required, enhancement circuit 96 may be eliminated and the plate of tube 287 directly coupled to the grid of tube 308 by coupling capacitor 309, as indicated by the dashed line 310. It is further observed that scan rate selector switch 195 inserts either zero resistance or the resistances of resistor 290 or 291 in the input circuit in order to provide a constant amplitude input video signal since the video signal level from the vidicon tube 44 increases with increased scan rates.

The cathode of tube 308 is coupled to a source of −25 volt potential by resistor 312 and its plate is coupled to a source of positive 300 volt potential by resistor 311. Tube 308 is a cathode follower with its output taken from its cathode, its grid also providing the clamp of a direct current-coupled driven clamp during blanking. The cathode of tube 308 is thus connected to the collector of transistor 313 which has its emitter connected to ground. Line and frame blanking pulses received in lines 212a and 227a from the respective sweep circuits 75, 76 (FIG. 10) are mixed in resistors 314, 315 and applied to the base of transistor 313. Thus, during a line or frame blanking pulse, transistor 313 grounds the cathode of tube 308 shorting the signal to ground. Zener diodes 316, 317 connect the plate of tube 308 to ground and set the plate voltage thereof.

Resistor 318, diode 319, diode 320, and resistors 322 and 323 are serially connected between the source of +25 volt potential and a source of −25 volt potential, the grid of tube 308 being connected to point 330 between diodes 319, 320. Diode 324 connects line blanking pulse input line 246 to a point between diode 320 and resistor 322. The negative-going line blanking pulses 78 are thus applied non-inverted to diode 324. The line blanking pulse input line 246 is also coupled to the base of transistor 325 by resistor 326, the base of transistor 325 also connected to the source of +25 volt potential by resistor 327. The emitter of transistor 325 is connected to ground and its collector is connected to a source of −25 volt potential by resistor 328. Transistor 325 thus inverts the line blanking pulse 78 and applies the thus inverted line blanking pulses to diode 329 which is coupled to the point 341 between diode 319 and resistor 318.

In the absence of a line blanking pulse 78, diode 329 conducts to −25 volts through resistors 318 and 328 thus back-biasing diode 319 to cut it off so that point 330 to which the grid of tube 308 is connected is floating, i.e., no clamp is applied to the grid of tube 308. In this condition, the grid of tube 308 follows the instantaneous input video signal wave form applied thereto to provide a resulting video signal across cathode resistor 312. It will be observed that transistor 325 is normally biased off by the voltage drop across resistors 326 and 327 thus permitting diode 329 to conduct so that point 341 between diode 319 and resistor 318 is below ground thus back-biasing diode 319. Application of a non-inverted and inverted line blanking pulse 78, respectively, to diodes 324 and 329 back-biases both diodes. Under this condition, the series circuit comprising resistor 318, diode 319, diode 320, and resistors 322, 323 conducts from +25 volts to −25 volts thus clamping point 330 and the grid of tube 308 with a direct current-driven clamp. This clamping action sets the direct current level for the pedestal of the blanking pulses in the video signal at 0 volts. It will be observed that the turning ON of transistor 313 by a blanking pulse thus grounding the video signal in tube 308 effectively prevents video signal leakage during blanking.

It will be observed as a description proceeds that from this point, the entire circuit is direct current-coupled to the modulator 90 thus providing direct current restoration which in turn provides the gray scale. It will further be observed that transistor 313 provides current for charging capacitor 309 during blanking so that any charge lost during a line time is restored maintaining the bias on the grid of tube 308 between blanking pulses and providing a flat base line.

Gain control potentiometer 332 connects the cathode of tube 308 to ground and its movable element is coupled to the base of transistor 333. Thus, during the absence of blanking when the grid of tube 308 is unclamped, the video signal passes through the gain control 332 to the base of transistor 333. Transistors 333 and 334 constitute a feed-back amplifier, the collector of transistor 333 being connected to +25 volts by resistor 335 and its emitter being connected to ground by resistor 336 and potentiometer 281. The collector of transistor 333 is connected to the base of transistor 334 which has its emitter connected to +25 volts by zener diode 321 and its collector connected to —25 volts by resistors 337 and 338. The emitter of transistor 333 is connected to point 339 between resistors 337 and 338 to which video signal output circuit 340 is connected, output circuit 340 being coupled to the modulator 90 as hereinafter described. In the specific embodiment, the pedestals of the blanking pulses are clamped to 0 volts with the maximum negative excursion of the video signal (white level) being —3 volts, potentiometer 281 setting the clip point on the maximum excursion of the video signal.

To provide composite blanking to the vidicon camera tube 44, the non-additive blanking pulse mixer circuit 94 is provided. Here, the line blanking pulse input line **212*a* and the frame blanking pulse input line 227*a* are respectively connected to the emitter of transistor 342 by resistors 343 and 344. The emitter is also connected to +25 volts through resistor 345, the base is connected to ground, and the collector is connected to +25 volts by resistor 347 and to —25 volts by resistors 348 and 349. The midpoint between resistors 348 and 349 is connected to the base of transistor 350 which has its emitter connected to ground and its collector connected to +25 volts by resistor 351. The collector of transistor 350 is connected to the bases of complementary emitter follower transistors 353, 354, the collector of transistor 354 being connected to ground and the collector of transistor 353 being coupled to +25 volts by resistor 355. The emitter of transistor 353 and the emitter of transistor 354 are connected to line 55 which is connected to the cathode 124 of the vidicon tube 44 (FIG. 4) and to ground by resistor 356**.

The potential drop provided by the voltage divider formed of resistors 347, 348, 349 normally biases transistor 350 ON and transistor 342 is normally biased OFF. Application of the negative-going blanking pulses to the emitter of transistor 342 turns that transistor ON thus turning transistor 350 OFF to provide an inverted positive-going pulse at its collector. With the transistor 350 normally conducting, i.e., in the absence of a blanking pulse, transistor 354 is biased ON and transistor 353 biased OFF thus short circuiting resistor 356 and coupling the cathode 124 of vidicon tube 44 directly to ground. The appearance of the inverted positive-going blanking pulse at the collector of transistor 350 biases transistor 354 OFF and transistor 353 ON thus developing across resistor 356 a positive-going blanking signal approaching +25 volts with reference to ground for driving the cathode of the vidicon.

Turning now to FIG. 8, the video and blanking signal is received from the video and blanking circuit on line 340, as previously indicated, and has its level set with the pedestals of the blanking pulses at 0 and the maximum extremity of the video signal, i.e., the "white" level at —3 volts. The 400 cycle tone from the control relay is received on line 156. The video line 340 is connected to the base of emitter follower transistor 357 which has its collector connected to —25 volts and its emitter connected by resistor 358 to the input of low pass filter 98. The base and emitter of transistor 357 are respectively connected to +25 volts by resistors 359 and 360. The 400 cycle tone line 156 is connected to the emitter of transistor 357.

Filter 98 is a constant delay low pass filter limiting the video signal to 0–1750 cycles, thus eliminating any high frequencies from the modulator 90.

Transistors 362 and 361 form a D.C. coupled feedback amplifier which sets the level of the video signal between +10 volts and 0 volts, i.e., the pedestals of the blanking pulses are clamped at +10 volts and the extremity of the video signal is at 0 volts. The output of filter 98 is connected to the base of transistor 362 which is also connected to ground by resistor 363. Transistor 362 has its collector connected to +25 volts by resistor 364 and its emitter connected to —25 volts by resistors 365 and 366. The collector of transistor 362 is connected to the base of transistor 361 which has its emitter connected to +25 volts by diode 367. The emitter of transistor 362 is connected to the collector of transistor 361 by resistor 368 and to ground by resistor 369. Zener diode 370 connects the midpoint between resistors 365 and 366 to a potential —5 volts from ground. The emitter of transistor 361 is also connected to ground by resistor 372 and the collector is connected to line 373.

It is thus seen that the modulating video signal having a level of from +10 volts at the peak of a blanking pulse to 0 volts at the maximum extremity, i.e., the "white" level of the video signal appears on line 373 which is the output of the feed-back amplifier of transistors 361, 362. The actual modulation is accomplished in the voltage divider and switching circuit comprising resistor 374, diode 375, the emitter-collector circuit of transistor 376 and resistor 377 connected between line 373 and —25 volts.

Base of transistor 376 is connected to ground. Diode 378 and zener diode 379 serially connect point 380 between resistor 374 and diode 375 to ground. Transistor 376 is normally conducting, and with a potential of 0 volts applied to point 382 between diodes 378 and 379, i.e., in the absence of a negative-going carrier signal pulse from square wave generator 89, diode 378 will be back-biased and current responsive to the video signal appearing on line 373 will flow in the voltage divider-switching circuit to provide the video signal at the collector of transistor 376.

The square wave carrier generator 89 is formed of transistors 383 and 384 which form a free-running multivibrator. Transistors 383 and 384 have their emitters respectively connected to ground and their collectors connected to —25 volts by resistors 385 and 386. The base of transistor 383 is connected to the collector of transistor 384 by capacitor 387 while the base of transistor 384 is connected to the collector of transistor 383 by capacitor 388. The base of transistor 383 is connected to a —25 volt source by resistor 389 and potentiometer 400 while the base of transistor 384 is connected to —25 volts by resistor 402 and potentiometer 403; potentiometers 400 and 403 are provided for symmetry adjustment. The collector of transistor 384 is connected to ground by zener diode 404 and the collector of transistor 383 is connected to point 382 between diode 378 and zener diode 379. In the specific embodiment, a square wave signal pulsed from 0 to —5 volts at 2.2 kc. is provided at the collector of transistor 383 and at point 382.

It will be seen that when the —5 volt potential from the square wave generator 89 is applied to point 382 the back-bias on diode 378 is removed and diodes 378 and 379 conduct the video signal to ground thus back-biasing diode 375 to turn it OFF and in essence, short circuiting resistor 374 so that current flow into transistor 376 is zero allowing the collector of transistor 376 to reach —25 volts. The result is pulsing or chopping of the video signal at a 2.2 kc. rate, as seen in FIG. 3J.

In this transmission system, it is desired to cancel the video or modulating signal component. It can be demonstrated mathematically that this may be accomplished by inverting the modulating signal and feeding it back at half amplitude to be mixed with the modulated signal. Thus, the video signal line 373 is connected to the base of transistor 405 which has its collector coupled back to the emitter of transistor 376 and which has its emitter connected to +25 volts by resistor 406, potentiometer 407 and resistor 408. The point between potentiometer 407 and resistor 408 is connected to ground by diode 409. In this manner, a video signal on line 373 is inverted, its amplitude reduced by one-half, and the resulting half-amplitude inverted video signal appearing at the collector of transistor 405 is applied to the emitter of transistor 376 to be mixed with the modulated signal in the voltage divider-switching network with the result that the signal appearing in line 410 connected to the collector of transistor 376 comprises the carrier and upper and lower side band components with the modulating signal component eliminated.

It will be observed that by virtue of the employment of a symmetrical square wave carrier signal, there are no second harmonics in the resulting modulated signal, only the odd harmonics being strong.

The output circuit 410 from the modulator 90 is coupled to the base of transistor 412 by capacitor 413. The base of transistor 412 is connected to point 414 of a voltage divider comprising resistors 415, 416, 417, and 418 connected across +25 volts and —25 volts. The point between resistors 415 and 416 is connected to ground by zener diode 419 while a point between resistors 417 and 418 is connected to ground by zener diode 420. This network sets the base of transistor 412 at a direct current level of 0 volts. Transistors 412 and 422 form a double emitter follower, the collectors of transistors 412 and 422 being connected to —25 volts, the emitters being connected to +25 volts by resistors 423 and 424, and the emitter of transistor 412 being connected to the base of transistor 422. As previously indicated, it is desired to filter out the upper side band component from the modulated signal and thus, the emitter of transistor 422 is coupled to the input circuit of upper side band filter 92.

The action of filter 92 is shown diagrammatically in FIG. 9. Assuming a modulating or video signal frequency of 1750 c.p.s. and a carrier frequency of 2200 c.p.s. it will be seen that the lower side band frequency is 450 cycles and the upper side band frequency 3950 c.p.s. Filter 92 is designed to pass the lower side band and to eliminate the upper side band, the carrier frequency being down by 6 db.

The resulting modulated signal comprising only the lower side band and carrier components appearing in the output circuit of filter 92 is applied to the base of transistor 425, the base of transistor 425 being connected to ground by resistor 426. Transistor 425 forms an amplifier with its emitter connected to +25 volts by resistor 427 and its collector connected to —25 volts by resistor 428. The emitter of transistor 425 is also connected to ground by potentiometer 429 and resistor 430. The output of amplifier 425 appearing on the collector is coupled to the base of emitter follower transistor 432 having its collector connected to —25 volts and its emitter connected to +25 volts by resistor 433. The emitter of transistor 432 is connected to ground by the primary winding 434 of coupling transformer 435 which has its secondary winding connected to the 600 ohm voice frequency band telephone line 32. The modulation system described above is further described and illustrated in application Serial No. 247,186, filed December 26, 1962, of Nelson E. Hoag and Jerry L. Holsinger, and assigned to the assignee of the present application.

In this connection, it will be understood that a normal voice band telephone line has a reasonable flat frequency response from 300 to 2800 cycles, however, that the term "voice band" generally is considered to refer to frequencies which may be as high as 5000 cycles. It will further be observed that the output of filter 92 is a sine wave thus eliminating the odd harmonics of the square wave carrier signal.

Figure 12:
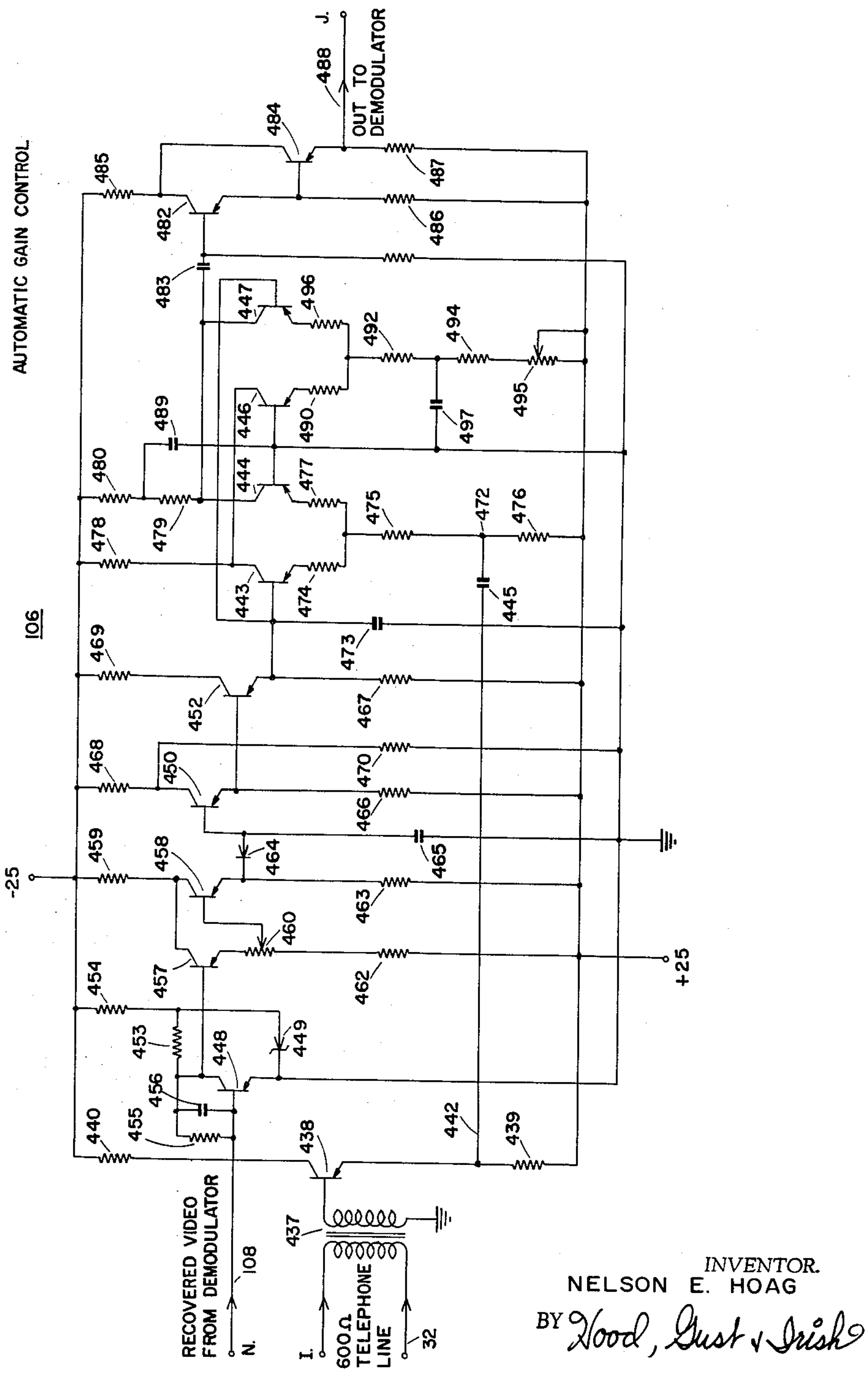
FIG. 12 is a schematic diagram of the automatic gain control circuit of the system of FIG. 11.

Referring now to FIG. 12, automatic gain control 106 is required when the telephone line 32 interconnecting the transmitting and receiving stations is of any appreciable length. Telephone line 32 is connected to the primary winding of isolation transformer 437 which has its secondary connected to the base of emitter follower transistor 438 having its emitter connected to +25 volts by resistor 439 and its collector connected to —25 volts by resistor 440. The output circuit 442 from emitter follower 438 carrying the received video signal is coupled to the emitter circuits of transistors 443 and 444 by coupling capacitor 445. A direct current gain-control voltage is provided for gain control of transistors 443, 444, 446 and 447 by transistors 448, 450, 452, 457 and 458.

The recovered video signal from the demodulator 107 is fed over line 108 to the base of transistor 448 which forms a high gain feedback amplifier. The emitter of transistor 448 is connected to ground and its collector is connected to —25 volts by resistors 453 and 454. Resistor 455 and capacitor 456 connect the collector of transistor 448 to its own base. Zener diode 449 and resistor 454 provide the proper voltage for the collector resistor 453 of transistor 448.

The collector of transistor 448 is connected to the base of transistor 457 which with transistor 458 forms a double emitter follower. The collectors of transistors 457 and 458 are connected to —25 volts by resistor 459. The emitter of transistor 457 is connected to +25 volts by potentiometer 460 and resistor 462, the adjustable element of potentiometer 460 being connected to the base of transistor 458 which has its emitter connected to +25 volts by resistor 463.

Diode 464 connects the emitter of transistor 458 to the base of the transistor 450 with capacitor 465 connecting the base of transistor 450 to ground, as shown. Diode 464 functions as a peak detector to detect and pass current only in response to the negative-going peaks of the recovered video signal, i.e., the pedestals of the negative-going blanking pulses. Capacitor 465 in conjunction with diode 464 functions as a long time constant integrating circuit to integrate the blanking pulses detected by the diode 464, the resulting integrated direct current level being applied to the base of transistor 450. It is thus seen that a direct current control voltage is provided at the base of transistor 450 which is responsive to the amplitude of the sync. pulses in the recovered video signal.

Transistors 450 and 452 form a double emitter follower with their emitters respectively connected to +25 volts by resistors 466 and 467 and their collectors are respectively connected to —25 volts by resistors 468 and 469. The resulting negative polarity direct current control voltage appearing at the emitter of transistor 452 is applied to the base of transistor 443 and to the base of transistor 447, which are also connected to ground by capacitor 473.

The collector of transistor 443 is connected to —25 volts by resistor 478 and its emitter is connected to +25 volts by resistors 474, 475, and 476. The output circuit 442 from emitter follower 438 which carries the incoming video signal is coupled to point 472 between resistors 475 and 476. The collector of transistor 444 is connected to —25 volts by resistors 479 and 480 while its emitter is connected to resistor 475 by resistor 477. Transistors 443 and 444 thus form a variable current divider, the video signal current respectively flowing therethrough dividing between transistor 443 and transistor 444 in accordance with the direct current control which is applied to the base of transistor 443. The resulting output signal appearing at the collector of transistor 444 is coupled to the base of emiter follower transistor 482 by coupling capacitor 483. Transistors 482 and 484 form a double emitter follower, their collectors being connected to —25 volts by resistors 485 and their emitters being respectively connected to —25 volts by resistors 486 and 487. The emitter of transistor 482 is connected to the base of transistor 484 and its emitter is connected to the demodulator 107 by line 488.

Transistors 446 and 447 provide direct current balance for the collectors of transistors 443 and 444. The base of transistor 444 is connected to the base of transistor 446, to ground, and to the midpoint between resistors 479 and 480 by capacitor 489. The collector of transistor 446 on the other hand is cross-connected to the collector of transistor 443 while the collector of transistor 47 is cross-connected to the collector of transistor 444. The emitter of transistor 446 is connected to +25 volts by resistors 490, 492, 494, and potentiometer 495 while the emitter of transistor 447 is connected to resistor 492 by resistor 496. A capacitor 497 connects the midpoint between resistors 492 and 494 to ground, as shown. By virtue of this cross-connection of the collectors of transistors 446 and 447 to the collectors of transistors 443 and 444, the collectors of those transistors are held at a constant potential level.

The variable current divider and direct current balancing portion of the automatic gain control circuit 106 is further described in application Serial No. 189,071 filed April 20, 1962, of W. W. Greutman assigned to the assignee of the present application.

Figure 13:
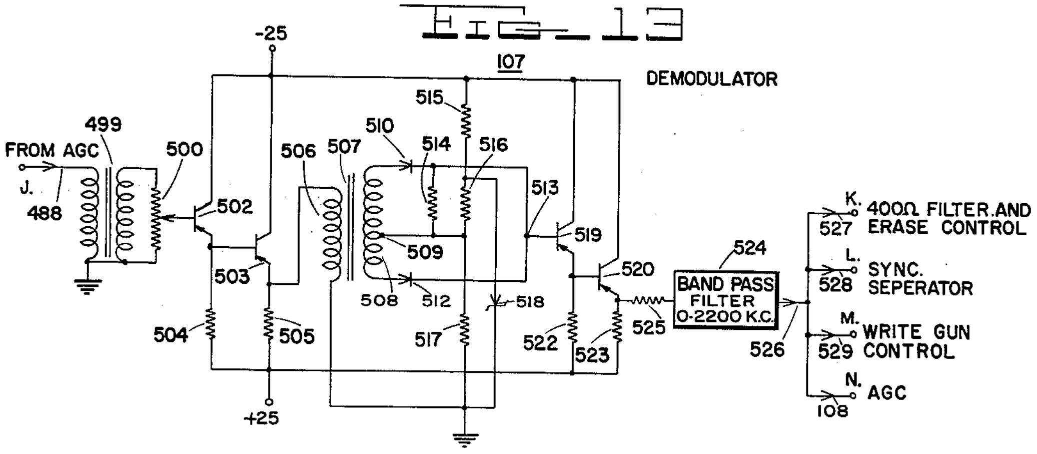
FIG. 13 is a schematic diagram of the demodulator portion of the receiving system.

Referring now to FIG. 13, the video signal received from the automatic gain control circuit 106 on line 488 is applied to the primary winding of transformer 499 having gain control potentiometer 500 connected across its secondary winding. The movable element of potentiometer 500 is connected to the base of transistor 502 which, with transistor 503, forms a double emitter follower, the collectors being connected to —25 volts and the emitters being respectively connected to +25 volts by resistors 504 and 505.

The emitter of transistor 503 is coupled to one side of primary winding 506 of transformer 507, the other side being connected to ground. Secondary winding 508 is center tapped at 509 with its two ends being connected together by diodes 510 and 512 to form a full-wave rectifier. Resistor 514 connects midpoint 513 between the diodes 510, 512 to center tap 509 and a voltage divider comprising resistors 515, 516, and 517 as connected across —25 volts and ground with center tap 509 being connected between resistors 516 and 517. Zener diode 518 connects a point between resistors 516 and 517 to ground. Point 513 is connected to the base of transistor 519 which with transistor 520 forms another double emitter follower, the collectors being connected to —25 volts and the emitters being connected to ground by resistors 522 and 523. The emitter of transistor 520 is coupled to band pass filter 524 by resistor 525. Band pass filter 524 is tuned to pass only the modulating, i.e., the video signal component of the transmitted signal, i.e., to pass frequencies from 0 to 2200 c.p.s. and to reject higher frequencies.

It will be recalled that in the modulation process, the modulating and upper sideband components were cancelled with the result that the transmitted signal contains only the lower side band and carrier signal components. In the demodulation process, the effect of the full wave rectification provided by diodes 510, 512 is to double the frequency of the carrier; the modulating or video signal component reappearing at the output of the band pass filter 524. The modulation and demodulation process employed in this system is described in application Serial No. 802,233 filed March 26, 1959, of A. Gatfield assigned to the assignee of the present application.

With the carrier frequency component being doubled, i.e., increased to 4.4 kc., this doubled carrier frequency component is eliminated by filter 524.

The recovered video signal (from 0 to 1750 c.p.s.) thus appears on the output circuit 526 of filter 524 and is coupled to the 400 cycle filter 109 and the erase control relay 112 by line 527, to the sync. separator 115 by line 528, to the writing gun control 119 by line 529 and to the automatic gain control 106 by line 108.

Figure 14:
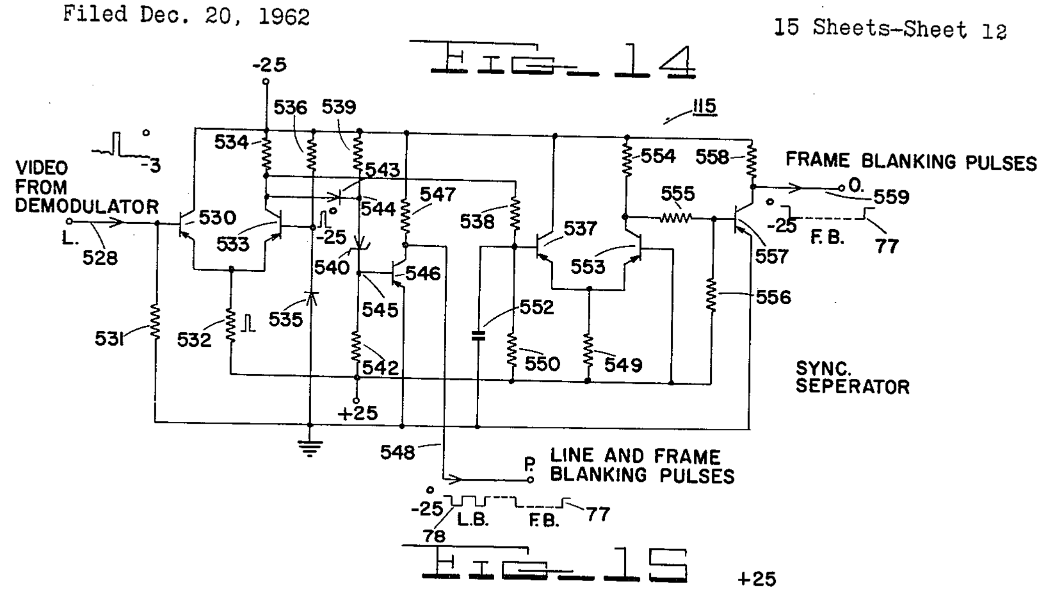
FIG. 14 is a schematic diagram of the synchronizing pulse separator circuit of FIG. 11.

Referring now to FIG. 14, the recovered video signal is received by the sync. separator circuit 115 from the demodulator 107 on line 528 and applied to the base of emitter follower transistor 530 which has its collector connected to —25 volts and its emitter connected to +25 volts by resistor 532. The base of transistor 530 is connected to ground by resistor 531. The recovered video signal from the demodulator has approximately 0 voltage at the peaks of the synchronizing pulses with the extremities of the video signal being —3 volts. Transistor 530 is normally on and is turned OFF by the positive-going synchronizing pulses in the recovered video signal. Transistor 533 has its emitter connected to the emitter of transistor 530, its collector connected to —25 volts by resistor 534 and its base connected to ground by diode 535. Transistor 533 is normally OFF, however, the positive-going pulse provided at the emitter of transistor 530 in response to the positive going synchronizing pulse applied to its base turns transistor 533 ON to provide a positive-going pulse at its collector.

The base of transistor 533 is connected to —25 volts by resistor 536 and its collector is connected to the base of transistor 537 by resistor 538. A voltage dividing-switching network formed of resistor 539, zener diode 540 and resistor 542 is connected between —25 volts and +25 volts. Diode 543 connects the collector of transistor 533 to point 544 between resistor 539 and zener diode 540. Point 545 between zener diode 540 and resistor 542 is connected to the base of transistor 546 which has its emitter connected to ground and its collector connected to —25 volts by resistor 547. In the absence of a synchronizing pulse in the recovered video signal applied to the base of transistor 530, the current flow through the voltage divider-switching network back-biases diode 543. Transistor 546 is normally ON thus providing a 0 voltage level at its collector to which the line and frame blanking pulse output circuit 548 is coupled. Appearance of the positive-going pulse at the collector of transistor 533 in response to the positive-going synchronizing pulse in the recovered video signal causes diode 543 to conduct thus turning transistor 546 OFF and lowering the potential of its collector to essentially —25 volts thus to provide the negative-going separated line blanking pulses 78 and frame blanking pulses 77 in output circuit 548.

Transistor 537 is an emitter follower having its collector connected to —25 volts and emitter connected to +25 volts by resistor 549. Its base is also connected to +25 volts by resistor 550 and to ground by capacitor 552.

Assuming now that a positive-going pulse has appeared at the collector of transistor 533 in response to a frame synchronizing pulse in the input video signal, this positive-going pulse will provide a potential which may be +5 volts on the base of transistor 537 thus turning it OFF and the capacitor 552 will have been charged to the base potential of transistor 537, i.e., +5 volts. Under these conditions, the potential at the emitter of transistor 537 will be essentially +5 volts and transistor 553 which has its base connected to +25 volts and its collector connected to —25 volts by resistor 554 will be turned ON so that its collector potential is essentially at 0 volts. Now, termination of the frame synchronizing pulse in the input video signal and thus of the positive-going pulse on the collector of transistor 533 will restore the potential of the base of transistor 537 to that established by the voltage divider formed by resistors 534, 538, and 550, which may be —12 volts. This immediately discharges capacitor 552 and turns transistor 537 ON decreasing the potential of its emitter essentially to —12 volts in turn turning transistor 553 OFF so that its collector potential falls to the level established by the voltage divider formed of resistors 554, 555 and 556 which may be on the order of —23 volts.

Assuming now that the first line synchronizing pulse following the above-referred to frame synchronizing pulse appears on the video signal, a corresponding positive-going pulse will again appear at the collector of transistor 533 and capacitor 552 will now begin to charge toward the +5 volt level of that pulse through resistor 538, however, the time constant of the charging circuit is such that the potential level of the base of transistor 537 established by the charge on capacitor 552 does not increase sufficiently rapidly to a point to turn OFF transistor 537 before termination of the line synchronizing pulse and the consequent discharge of capacitor 552. Thus, transistor 537 is not turned OFF in response to line synchronizing pulses in the input video signal, but on the contrary remains ON during the entire sequence of line synchronizing pulses so that the voltage at its emitter remains at essentially —12 volts. Thus, transistor 553 remains turned OFF during this period so that the —23 volt potential remains at its collector.

Upon the occurrence of a frame synchronizing pulse in the input video signal, capacitor 552 has time to become fully charged to the +5 volt level of the positive-going pulse on the collector of transistor 533 thus turning transistor 537 OFF and increasing the potential at its emitter to essentially +5 volts. This increase in the emitter potential of transistor 537 turns transistor 553 ON increasing its collector potential to essentially 0 volts at which it remains during the remainder of the frame synchronizing pulse. Thus it is seen that positive-going frame synchronizing pulses only are provided at the collector of transistor 553.

The collector of transistor 553 is coupled to the base of transistor 557 by resistor 555, transistor 557 having its emitter connected to ground and its collector connected to —25 volts by resistor 558. The positive-going frame pulse appearing at the collector of the transistor 553 is thus inverted and appears as the desired negative-going frame blanking pulse at the collector of transistor 557 to which the frame blanking pulse output circuit 559 is connected.

Figure 15:
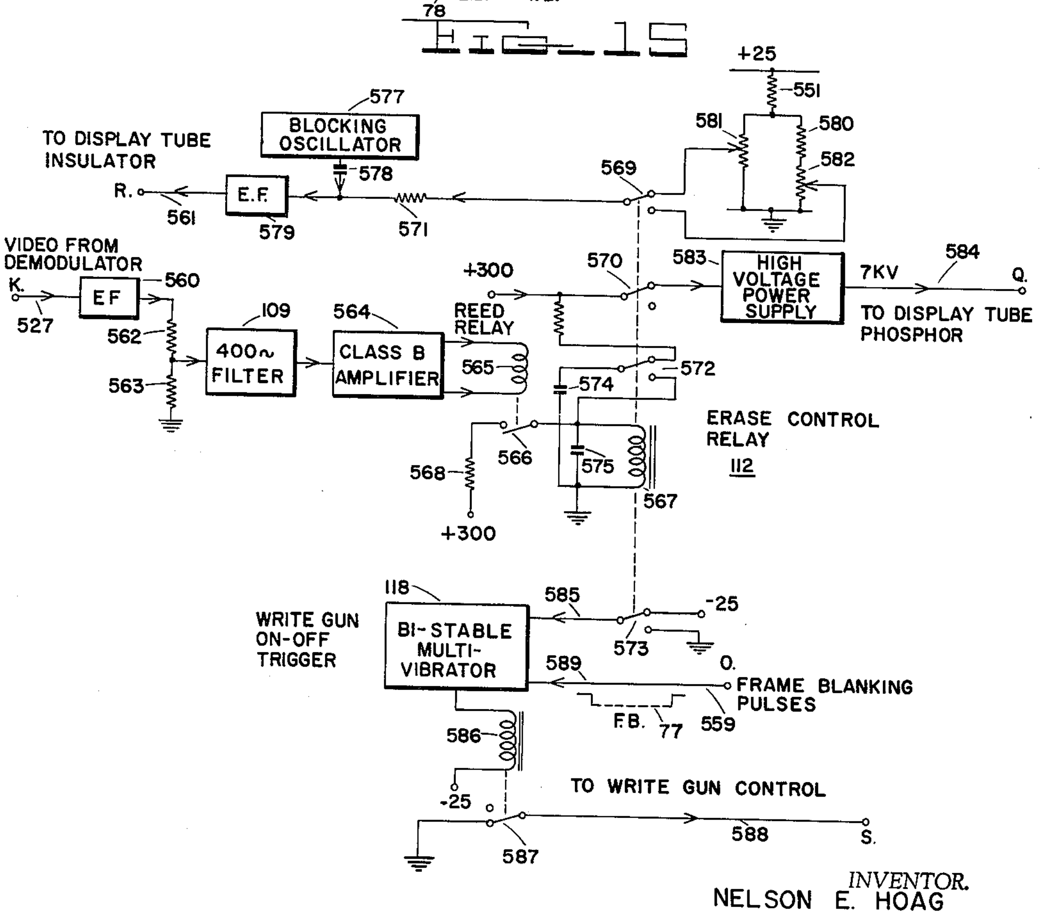
FIG. 15 is a schematic diagram illustrating the erase control relay and associated circuitry of the receiving system.
Figure 15:
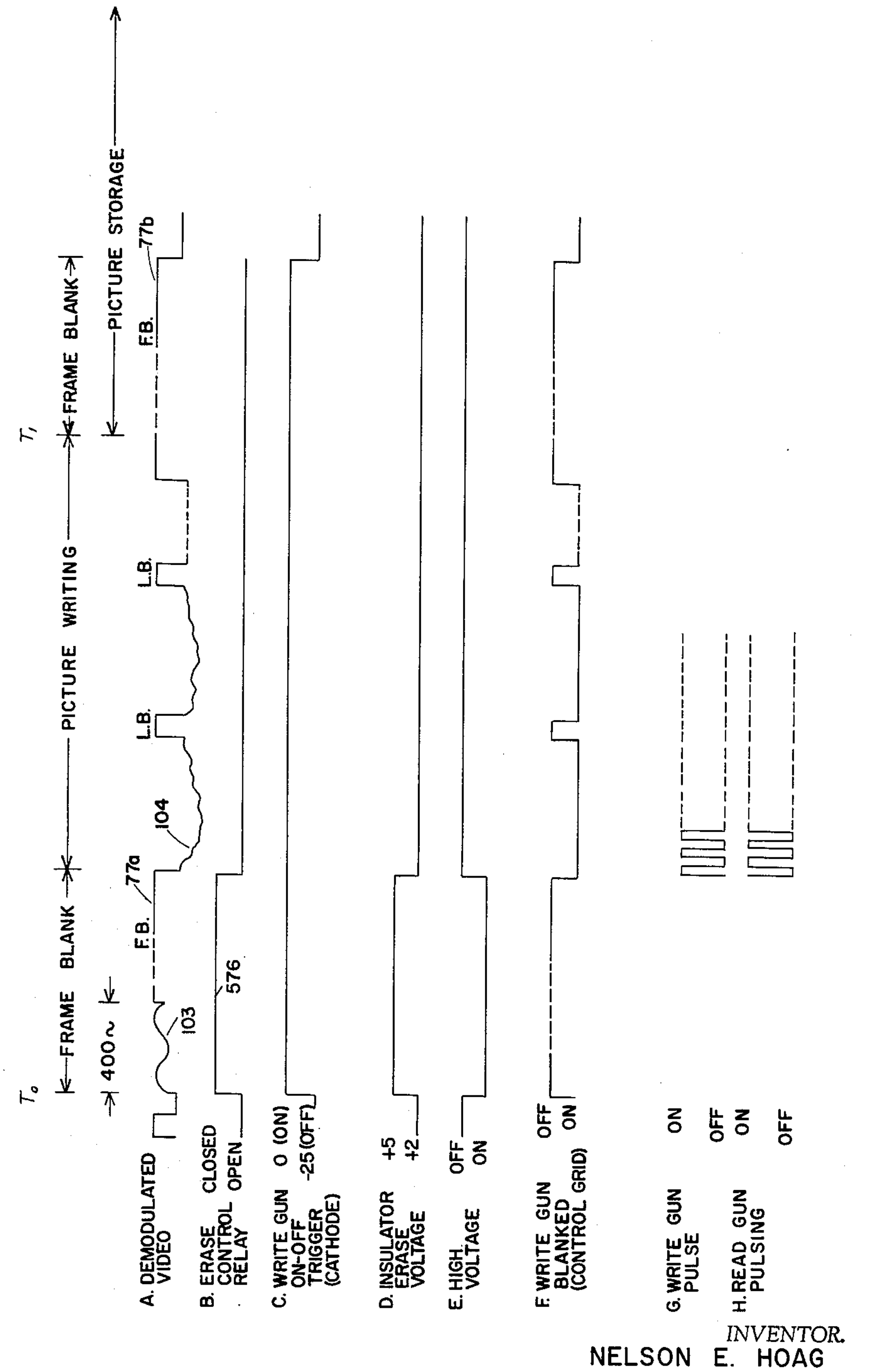

Referring now to FIG. 15, the recovered video, including the 400 cycle tone, is received from the demodulator 107 on line 527, passed through a conventional emitter follower 560 and applied to the input circuit of 400 cycle filter 109 from voltage divider formed of resistors 562 and 563. Filter 109 is a narrow band pass filter passing only the 400 cycle tone to the exclusion of lower and higher frequencies (thus excluding the subsequent picture-responsive video signal). The output circuit of filter 109 is coupled to a conventional class B amplifier 564, the output of which energizes the coil of reed relay 565. The contact 566 of reed relay 565 connects capacitor 575 to a +300 volt source of energizing potential through resistor 568. The potential on capacitor 575 thus charges toward +300 volts each time reed relay contacts 566 close. When the voltage across capacitor 575 reaches 60 volts, operating coil 567 closes.

Erase control relay 112 is provided with contacts 569, 570, 572, and 573, which are in the positions shown in FIG. 15 when coil 567 is de-energized. Energization of coil 567 by closing of the reed relay contacts 566 actuates contact 572 to its second position to couple capacitor 574 across coil 567 in shunt with capacitor 575 thus to maintain coil 567 energized despite chattering of the relay contacts 566 and further for the period 576 (FIG. 16) which is longer than the exposure period 86 (FIG. 3) in which the 400 cycle tone is provided, but which is shorter than the duration of the first frame blanking pulse **77*a*** of the new sequence.

Capacitor 574 thus provides the time delay 123 for the erase control relay 112.

When erase control relay coil 567 is de-energized, i.e., prior to occurrence of the 400 cycle tone and after termination of the holding period 576 of the relay, relay contact 569 couples the insulator screen 113 of the storage tube 29 to a suitable source of potential, such as +2 volts by resistor 571 and emitter follower 579 lead 561. This normal insulator potential is established by a voltage divider comprising resistor 551 and potentiometer 581. The insulator 113 is pulsed in known fashion by one microsecond pulses provided by conventional free running blocking oscillator 577 coupled to emitter follower 579 by capacitor 578.

Energization of erase control relay coil 567 in response to the 400 cycle tone actuates contact 569 to a second position to couple a source of erasing potential, such as +5 volts to the insulator 113 of the display tube 29, this erase potential being established by the voltage divider comprising resistor 551, resistor 580 and potentiometer 582.

Erase control relay 112 thus applies the +5 volt erase potential to the insulator 113 during the period 576 during which erase control relay 112 is energized, as shown in FIG. 16B.

Contact 570 of erase control relay 112 in its normally closed position, i.e., with coil 567 de-energized, couples a +300 volts to high voltage power supply 583 which in turn supplies a suitable high potential, such as 7 kv., to the display screen or phosphor 114 of the storage tube 29 by high voltage lead 584. Energization of erase control relay coil 567 responsive to the occurence of the 400 cycle tone actuates contact 570 to its normally open position thereby breaking the connection of the +300 volt energizing potential to the high voltage power supply 583, thus removing the high voltage from the display screen 114 during the period 576 during which erase control relay 112 is energized, as shown in FIG. 16E.

Contact 573 of erase control relay 112 in its normally closed position, i.e., with coil 567 de-energized, couples one of the input circuits 585 of bistable multivibrator 118, which forms the write gun ON-OFF trigger, to a source of —25 volt potential. As will be be hereinafter described in connection with FIG. 21 which shows the circuit of the bistable multivibrator 118, under these conditions, multivibrator 118 is in one stable state to energize relay coil 586. This normal energization of coil 586 actuates its contact 587 to its closed position, as shown, to connect lead 588 to ground. As will be described in connection with FIG. 17, connection of lead 588 to ground turns OFF writing gun 65 of storage tube 29.

When coil 567 of erase control relay 112 is energized in response to the occurrence of the 400 cycle tone, contact 573 is actuated to connect input circuit 585 of multivibrator 118 to ground which, as will be hereinafter described, switches multivibrator 118 to its second stable condition in which relay coil 586 is de-energized thus actuating its contact 587 to the open position to disconnect line 588 from ground. Disconnection of line 588 from ground turns ON writing gun 65 of storage tube 29, as shown in FIG. 16C.

Frame blanking pulse output circuit 559 from the sync. separator circuit is coupled to the other input circuit 589 of multivibrator 118 for impressing the frame blanking pulses 77 thereon. The trailing edge of a frame blanking pulse switches bistable multivibrator 118 back to its first stable position, i.e., with coil 586 energized, however as will be described in connection with FIG. 21, input circuit 589 of multivibrator 118 is provided with a hold-off circuit so that the trailing edge of the first frame blanking pulse **77*a* of the new sequence does not switch the multivibrator 118, but on the contrary, the multivibrator is not switched to its first stable position until the trailing edge of the second frame blanking pulse 77*b*. Thus, the trailing edge of the second frame blanking pulse 77*b* of the new sequence switches the multivibrator 118 back to its initial stable condition energizing coil 586 and actuating contact 587 to its closed position to ground lead 588 and thus turning off the writing gun 65 of the storage tube 29**, as shown in FIG. 16C.

Figure 21:
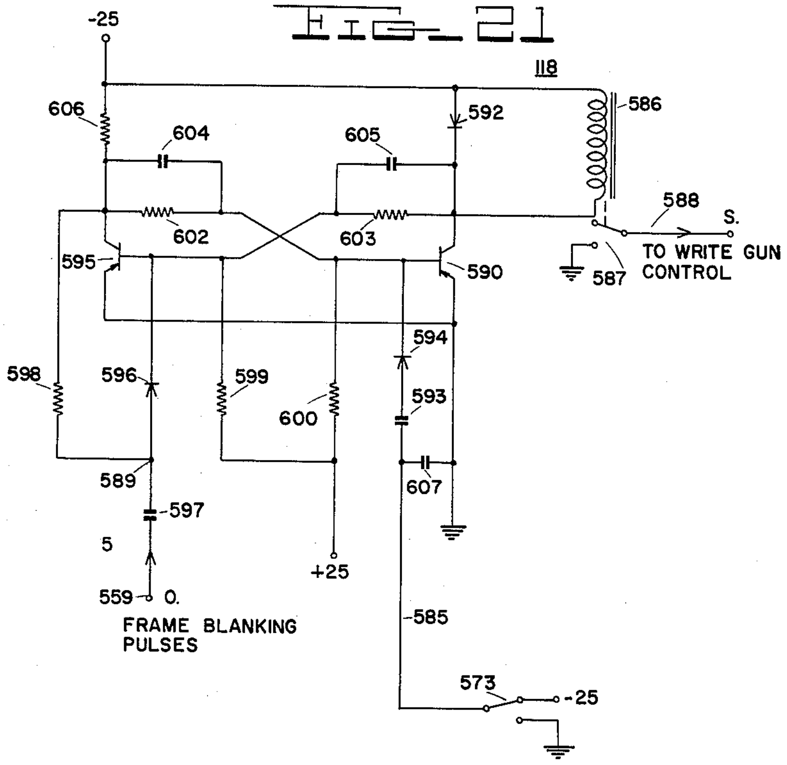
FIG. 21 is a schematic diagram of the writing gun trigger circuit for the system of FIG. 11.

Referring now briefly to FIG. 21 in which a suitable circuit for the bistable multivibrator write gun ON-OFF trigger 118 is shown, transistor 590 is normally turned ON thereby energizing relay coil 586 connected to its collector, diode 592 being connected across relay coil 586 to prevent an inductive kick when transistor 590 is turned OFF. Input circuit 585 is coupled to the base of transistor 590 through capacitor 593 and diode 594 and thus actuation of contact 573 of control relay 112 to switch the connection of input line 585 from —25 volts to ground turns OFF transistor 590, thus de-energizing relay coil 586 and turning ON transistor 595.

Input circuit 589 is coupled to the base of transistor 595 by diode 596 and with the exception now to be pointed out, the remaining circuitry of multivibrator 118 is conventional so that application of a positive-going pulse to the input circuit 589, i.e., a pulse from a negative voltage level to ground would turn OFF transistor 595, turn ON transistor 590 and again energize relay coil 586. However, in this circuit, capacitor 597 couples line 559 from the sync. separator 115 to input circuit 589 and resistor 598 is connected from the point between the capacitor 597 and diode 596 to the collector of the transistor 595. Capacitor 597 and resistor 598 form a hold-off circuit with a time constant sufficiently long to prevent transistor 595 from being turned OFF by the trailing edge of the first blanking pulse **77*a* of the new sequence with the result that transistor 595 is turned OFF only by the trailing edge of the second frame blanking pulse 77*b***.

Thus, as above described, bistable multivibrator write gun ON-OFF trigger 118 is switched from one of its stable conditions to the other at $T_0$ by the erase control relay 112 in response to the 400 cycle tone thereby turning the writing gun 65 of the storage tube 29 ON and is switched back to its first stable condition in response to the trailing edge of the second frame blanking pulse **77*b*, thereby turning the writing gun 65** OFF, as shown in FIG. 16C.

Figure 17:
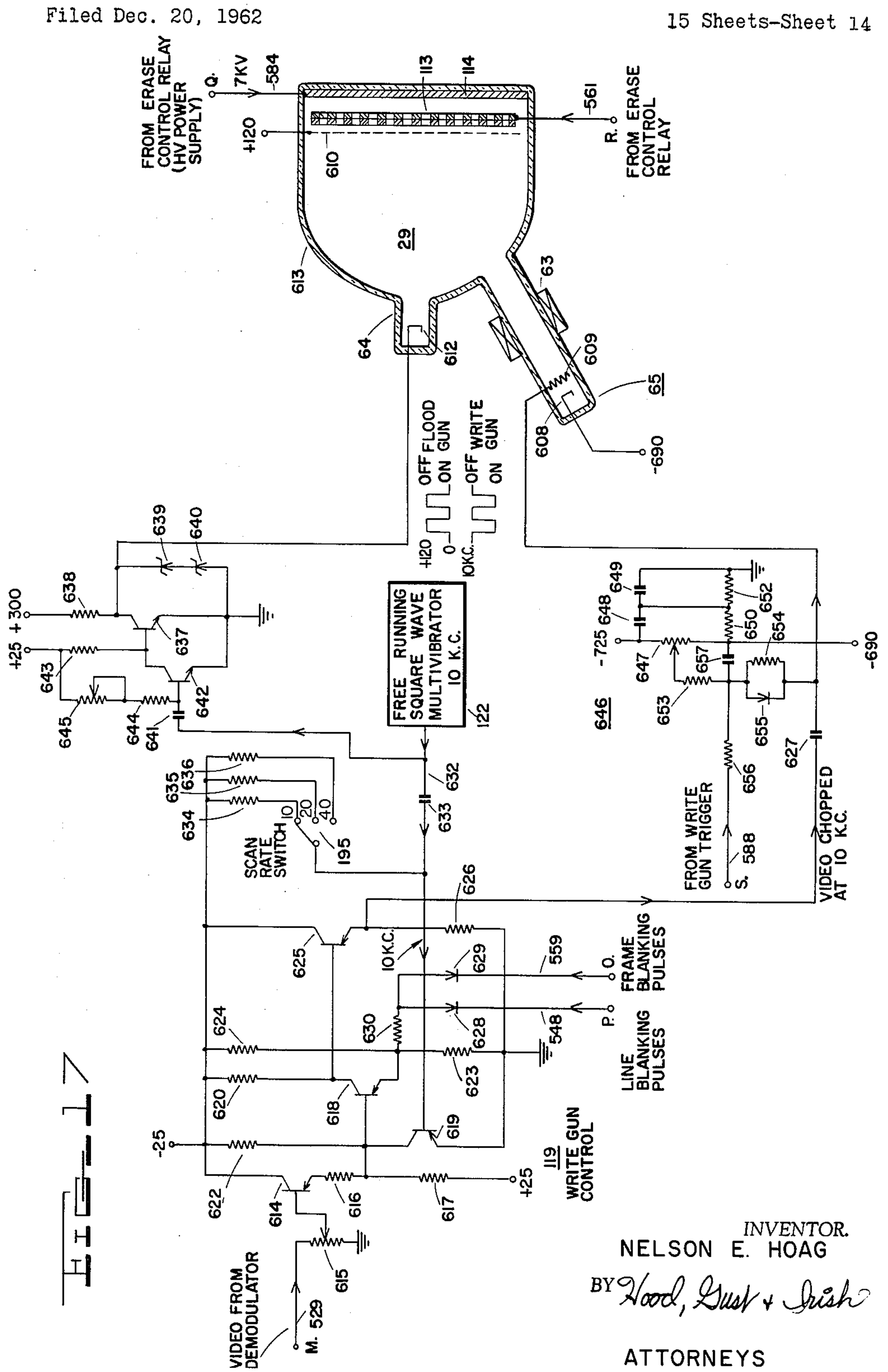
FIG. 17 is a schematic diagram showing the storage tube and the reading and writing gun circuitry associated therewith.

Referring now to FIG. 17, writing gun 65 of storage tube 29 includes a cathode 608 coupled to a suitable source of potential, such as —690 volts, control grid 609, and other conventional beam forming and accelerating elements, as is well known to those skilled in the art. A suitable collector electrode 610 is provided in front of storage electrode 113 and is connected to a suitable source of potential, such as +120 volts. The high velocity writing electron beam provided by writing gun 65, modulated by the video signal applied to grid 609 as will be hereinafter described, is rectilinearly scanned by the deflection coils 63 over the storage electrode 113 thereby providing a charge pattern thereon corresponding to the video signal and in turn to the optical image impressed upon the vidicon camera tube 44.

The reading or flood gun 64 includes a cathode 612 and other conventional elements for providing a low velocity electron beam which floods the entire area of the storage electrode 113. As is well known, the low velocity electrons of the flood beam pass through the openings in the storage electrode 113, being modulated by the incremental charges thereon, and impinge upon the phosphor display screen 114 to provide the resulting optical image. The interior wall of the envelope 613 of storage tube 29 may have conventional conducting wall coatings thereon connected to suitable sources of potential for columnating the flood beam, as is well known to those skilled in the art.

The write gun control unit 119 includes transistor 614 having the video signal from the demodulator received in line 529 applied to its base by gain control potentiometer 615. Transistor 614 has its collector connected to —25 volts and emitter connected to +25 volts by resistors 616 and 617. The midpoint between resistors 616 and 617 is connected to the base of an amplifier transistor 618 and to the collector of a switching transistor 619. The collector of transistor 618 and its base are respectively connected to —25 volts by resistors 620 and 622, the emitter of transistor 619 is connected to ground and the emitter of transistor 618 is connected to ground by resistor 623 and to —25 volts by resistor 624. Transistor 618 operates as a normal video amplifier when switching transistor 619 is turned OFF. The video signal appearing at the collector of transistor 618 is applied to the base of emitter follower transistor 625 having its collector connected to —25 volts and emitter connected to ground by resistor 626. The video signal thus appearing at the emitter of transistor 625 is coupled to the control grid 609 of writing gun 625 of the storage tube 29 by coupling capacitor 627.

As previously indicated, the writing beam of the storage tube is turned OFF by the frame and line blanking pulses 77, 78 and to accomplish this, the line and frame blanking pulses received on lines 548 and 559, respectively from the sync. separator 115 are added by diodes 628 and 629 and resistor 630 and applied to the emitter of transistor 618. Thus, the negative-going line and frame blanking pulses, respectively turn OFF transistor 618 thus disconnecting the control grid 609 of the writing gun 65 from the demodulator during the blanking pulses.

As also previously indicated, in order to increase the storage time and thus the display period of storage tube 29, the writing beam and the flood beam are pulsed ON and OFF alternately, at a rate substantially higher than the frequency of the carrier signal. To accomplish this pulsing of the writing and flood beams, a conventional free-running square wave multivibrator 122 is provided, having a frequency of 10 kc. in the specific embodiment. The output circuit 632 of the multivibrator 122 is coupled to the base of switching transistor 619 by coupling capacitor 633. Resistors 634, 635, and 636 are selectively coupled between —25 volts and the base of transistor 619 by scan rate selector switch 195 in order to adjust the ON time of transistor 619 for the 10, 20, or 40 second per frame scanning rate. It will now be seen that a negative-going pulse applied to the base of transistor 619 from the multivibrator 122 will turn transistor 619 ON thereby shorting the video signal on the base of transistor 618 to ground. Multivibrator 122 and switching transistor 619 thus chop the video signal received from the demodulator at the 10 kc. rate.

In order to pulse the flood beam ON and OFF at the 10 kc. rate, the cathode 612 of the reading or flood gun 64 is connnected to the collector of transistor 637 which has its emitter connected to ground and its collector connected to a source of +300 volt potential by resistor 638. Zener diodes 639 and 640 connect the collector of transistor 637 to ground. It will be seen that when transistor 637 is turned ON, cathode 612 of the reading gun 64 is directly connected to ground, thereby to provide the flood electron beam.

The output circuit 632 of the 10 kc. multivibrator 122 is coupled to the base of switching transistor 642 by coupling capacitor 641. Transistor 642 has its emitter connected to ground and its collector connected to the base of transistor 637 and to a source of +25 volt potential by resistor 643. Resistor 644 and potentiometer 645 connect the base of transistor 642 to +25 volts. It will be seen that when transistor 642 is turned ON, transistor 637 will be turned OFF thus impressing the +120 volt potential established by diodes 639, 640 onto the flood cathode 612 to turn OFF the flood electron beam. It will further be seen that a positive-going pulse from the multivibrator 122 impressed upon the base of transistor 642 will turn ON the same thus alternately pulsing the flood cathode 612 between 0 and +120 volts. It will be recalled by reference to FIG. 15 that contact 587 of relay 586 of write gun ON-OFF trigger 118 grounded lead 588 to turn the writing gun 165 of the storage tube 29 OFF. A biasing, intensity control, and direct current restoring circuit 646 is provided having intensity control potentiometer 647 connected between a source of −725 volts and a source of −690 volts. Capacitors 648 and 649 and resistors 650 and 652, connected as shown, provide a filter for the power supply, the movable element on the potentiometer 647 is connected to the control grid 609 of the writing gun 65 by resistor 653 and resistor 654 having diode 655 connected in shunt therewith. Lead 588 of the write gun ON-OFF trigger 118 is connected to the midpoint between resistors 653 and 654 by resistor 656. Capacitor 657 couples this point to a source of −690 volts.

It will be seen that potentiometer 647 provides the requisite negative direct current bias on the control grid 609 of writing gun 65 of the storage tube 29, this bias being selectively variable to provide the desired gain intensity. By virtue of the 10 kc. chopping of the video signal, it is possible to couple the video signal to the control grid 609 of the writing gun 65 which is at a potential on the order of −700 volts, with a relatively small capacitor 627. It will further be seen that grounding of the lead 588 by contacts 587 of relay 586 biases the control grid 609 to turn OFF the writing beam without jeopardizing the direct current levels provided by the circuit 646 when lead 588 is not grounded. It also will be seen that diode 655 provides the direct current restoration by clamping on the negative pedestals of the blanking pulses.

Figure 18:
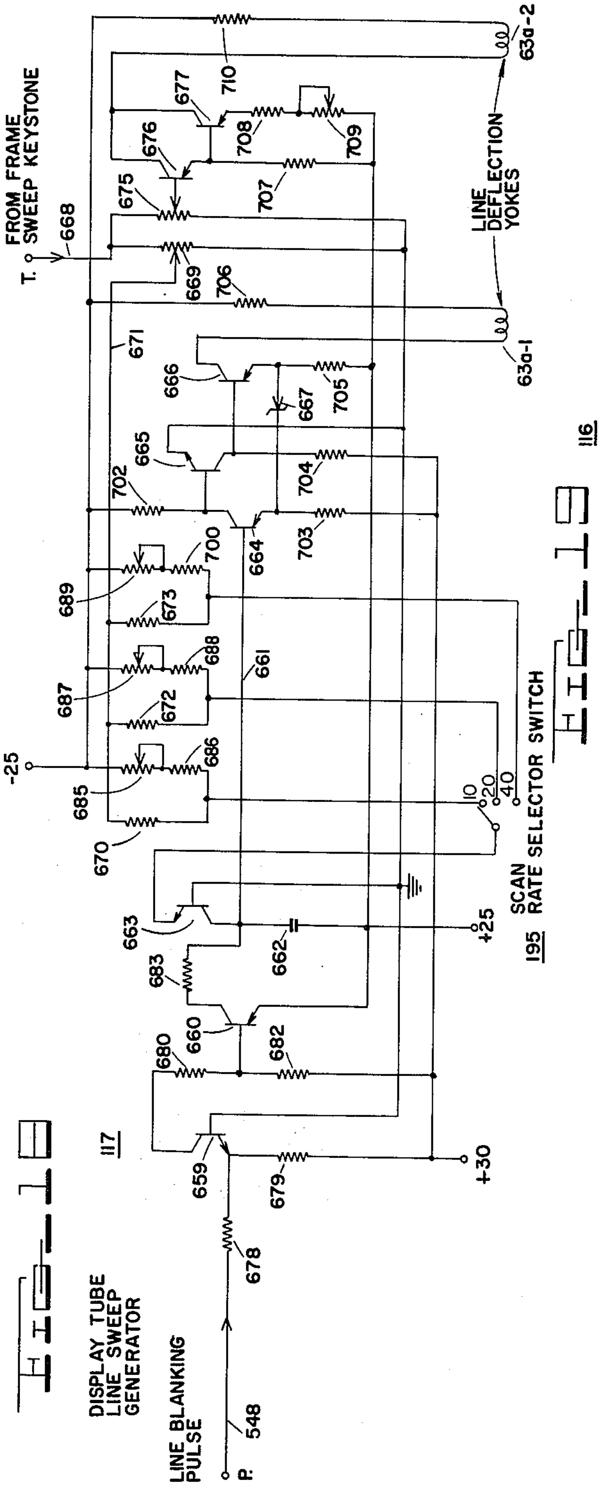
FIG. 18 is a schematic diagram of the line sweep generating circuit of the display tube.
Figure 19:
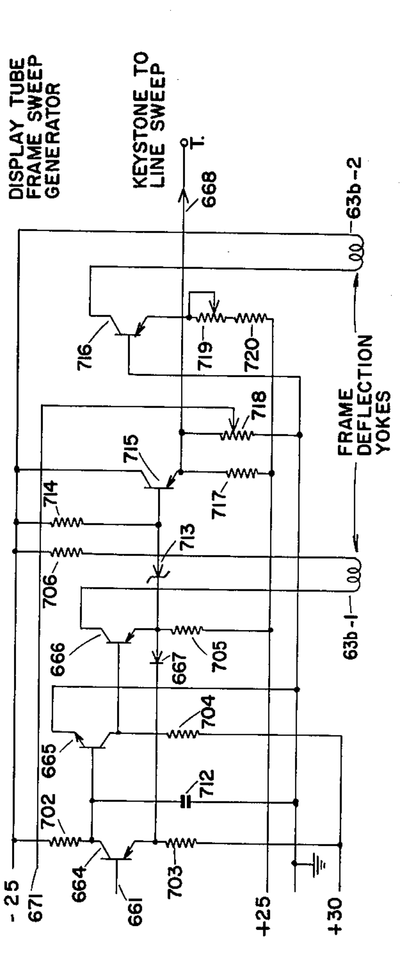
FIG. 19 is a fragmetary schematic diagram of the frame sweep generating circuit for the display tube.

Referring now to FIGS. 18 and 19, FIG. 18 is a schematic diagram of the line sweep generator circuit 117 for the storage tube 29 while FIG. 19 is a fragmentary schematic diagram showing the respects in which the frame sweep generator 116 for the storage tube 29 differs from the line sweep generator 117.

It will be recognized that the line and frame sweep generators 117, 116 for the storage tube 29 are similar in circuit configuration to the line and frame sweep generators 75, 76 for the vidicon camera tube 44, as shown in FIG. 10 and described above, and these circuits will therefore be described only to the extent that they functionally differ from the line and frame sweep generators for the vidicon camera tube.

Figure 20:
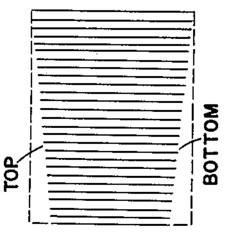
FIG. 20 is a diagram showing the line and frame scanning employed in the invention and the keystone correction provided in the display tube.

Referring additionally to FIG. 20, in the specific embodiment of the invention illustrated and described, the line scanning is vertical, and is viewed on the display screen of the storage tube 29 with the frame scanning being horizontal from left to right, i.e., the picture is written onto the display screen of the storage tube from left to right during the 10, 20, or 40 second frame scanning time, there being no interlace. The reading and writing guns 64, 65 of the storage tube 29 are disclosed in a horizontal plane in the specific embodiment and, by virtue of the provisions of the offset writing gun, keystone distortion appears in the image on the display screen as shown in FIG. 20.

The line blanking pulses 78 (and also the frame blanking pulses 77) are supplied to the line sweep generator 117 from the sync. separator 115 on line 548 and applied to the emitter of transistor 659 which is normaly off. The resultant negative-going pulses are applied to the base of transistor 660 which turns it ON to discharge the sweep voltage generating capacitor 662. Upon termination of the blanking pulse, the capacitor 662 charges through constant current transistor 663 and the particular resistance network selected by the scan rate selector switch 195. The resulting saw-tooth wave form signal is applied to transistors 664, 665, and 666 with line deflection yoke 63*a*–1 being supplied from the collector of transistor 666. Feed-back is provided, as in the case of the vidicon sweep circuits, by zener diode 667.

It will be observed that a frame sweep voltage from the frame sweep generator 116 is supplied to the line sweep generator 117 by line 668. Potentiometer 669 applies a portion of the frame sweep voltage to the scan rate selector resistors 670, 672, and 673 thereby to vary the amplitude of the line sweep voltage in accordance with the frame sweep voltage and thus to correct the bottom portion of the keystone distortion, as shown in FIG. 20. Another portion of the frame sweep voltage on line 668 is supplied by potentiometer 675 to the base of transistor 676 which with transistor 677 drives line deflection yoke 63*a*–2 which in turn corrects the top portion of the keystone distortion as shown in FIG. 20.

In the frame sweep genertaor 116, capacitor 712 is coupled across the base of transistor 665 and ground and the frame sweep voltage from emitter follower 666 is coupled to the base of emitter follower transistor 715 by zener diode 713, the resulting frame sweep signal voltage for keystone distortion correction in the line sweep generator 117 being taken from the emitter of line 668, as shown. Here, the keystone distortion correction voltage for line 671 is taken from potentiometer 718 connected across line 668 and ground as shown. Centering control for the frame sweep is provided by transistor 716 which drives frame deflection yoke 63*b*–2 from its collector as shown. In the frame sweep generator 116, resistor 683, of the line sweep circuit 117 is eliminated.

The pulsing of the flood beam at a relatively high rate in order substantially to increase the storage time together with the alternate pulsing of the writing beam in a time-sharing arrangement is described in application Serial No. 109,082 filed May 10, 1961, of J. H. Holsinger and the present inventor, and assigned to the assignee of the present application. If shorter storage times, i.e., on the order of two minutes, are permissible, pulsing of the flood beam may be eliminated, the writing beam, however, is still preferably pulsed in order to permit coupling the video signal to the writing gun with a relatively small capacitor.

It will be readily seen that the vidicon tube 44 together with shutter 47 and a suitable lens 42 may be mounted in a portable camera unit to permit the system to be used for transmitting a still picture "snapped" from a moving scene. The system may thus be employed for transmitting any picture which could ordinarily be taken with a conventional photographic camera with comparable exposure time.

It will now be seen that in the above-described system, control relay 84 initiates a frame blanking pulse which automatically resets the sweeps of the vidicon back to the beginning of a frame and blanks the vidicon beam. The control relay simultaneously actuates the mechanical shutter to expose the vidicon to whatever image the lens is viewing and transmits the 400 cycle tone to the receiver where it is employed to erase a previously stored picture from the display tube. The newly initiated frame blanking pulse is also transmitted to the receiver and automatically resets the sweeps of the display tube back to the beginning of a frame. At the end of the newly initiated frame blanking pulse, the vidicon scans the picture in one frame, the resulting video signal being transmitted to the receiver and written into the storage tube for display for a period following transmission of the picture.

In order to permit transmission of the video signal over ordinary voice frequency band telephone lines, unusually low scanning rates are employed, the video signal being modulated and demodulated in a system which allows the highest video frequency to approach .9 of the carrier frequency.

In a specific embodiment of the system of the invention employing the specific vidicon and storage tube as indicated and with the scanning rates and frequencies indicated, the following component values were employed:

*Preamp 95*

| | |
|---|---|
| R125 | meg. 8.2 |
| R134 | 180K |
| R135 | 20K |
| Tube **130** | 6112 |

*Control relay 84 and bistable 81*

| | |
|---|---|
| C145 | mf. 4 |
| R146 | 470K |
| R147 | 20K |
| R148 | 3900 |
| C149 | mf. 500 |
| C153 | mf. .47 |
| Trans. **154** | 2N1377 |
| R155 | 1K |
| R157 | 510K |
| Diode **158** | 1N277 |
| C159 | mf. 1 |
| R160 | 100K |
| R161 | 100K |
| Trans. **163** | 2N1377 |
| Trans. **164** | 2N1377 |
| R165 | 82K |
| C166 | mmf. 47 |
| R167 | 82K |
| C168 | mmf. 47 |
| Diode **170** | 1N277 |
| Diode **175** | 1N277 |
| Diode **178** | 1N277 |
| C169 | mmf. 470 |
| C174 | mf. .47 |
| R172 | 470K |
| R173 | 470K |
| R176 | ohms 68,000 |
| R177 | 470K |

*Line and frame timers 72, 73 and reset trigger 91*

| | |
|---|---|
| Diode **192** | 1N277 |
| Diode **193** | 1N277 |
| Diode **194** | 1N277 |
| Diode **199** | 1N459 |
| Diode **205** | 1N751 |
| C196 | mf. .004 |
| R201 | 220K |
| Trans. **198** | 2N1377 |
| R200 | 470K |
| R202 | 100K |
| R204 | 10K |
| C203 | mf. .01 |
| C208 | mf. .47 |
| Trans. **229** | 2N1377 |
| R232 | ohms 47 |
| R233 | 10K |
| R234 | 100K |
| Diode **235** | 1N759 |
| C230 | mf. .015 |
| C236 | mf. .1 |
| C213 | mf. .004 |
| R211 | 220K |
| Diode **218** | 1N459 |
| R219 | 470K |
| R220 | 100K |
| R223 | 10K |
| Diode **224** | 1N751 |
| C222 | mf. .01 |

*Sweep generators 79, 80*

| | Line | Frame |
|---|---|---|
| Trans. 237 | 2N358A | |
| Trans. 238 | 2N1377 | |
| Trans. 248 | 2N358A | |
| Trans. 239 | 2N1377 | |
| Trans. 240 | 2N358A | |
| Trans. 241 | 2N1377 | |
| Trans. 242 | 2N358A | |
| Trans. 243 | 2N1039 | |
| R251 | 2,200 ohms | |
| R245 | 47K | |
| R249, 22K | | 10K. |
| R250, 10K | | 4,700 ohms. |
| R252 | 100K | |
| R253 | 100K | |
| R262 | 4,700 ohms | |
| R263 | 10K | |
| R264, 1,000 ohms | | 470 ohms. |
| C285 | 01mf | |
| R283, 47 ohms | | 100 ohms. |
| R254, 36K | | 100K. |
| R255, 20K | | 50K. |
| R256, 27K | | 56K. |
| R257, 10K | | 20K. |
| R258, 15K | | 33K. |
| R259, 10K | | 10K. |
| C244, .47mf | | 100mf. |
| R277, 47K | | 15K. |
| Diode, 278 | 1N1316 | |
| Diode, 265 | 1N751 | |
| Diode, 279 | 1N1314 | |
| R266 | 10K | |
| R282 | 27K | |
| R280 | 1,300 ohms | |
| R284, 1,000 ohms | | 470. |

*Enhancement circuit 96, video and blanking 97, and blanking pulse mixer 94*

| | |
|---|---|
| R290 | ohms 4000 |
| R291 | do. 8200 |
| R288 | 18K |
| C289 | mf. .022 |
| Tube **287** | 6112 |
| Tube **308** | 6112 |
| R293 | 470K |
| R292 | 220K |
| R301 | 120K |
| R294 | 150K |
| Tube **295** | 6112 |
| Tube **300** | 6112 |
| R298 | meg. 2.2 |
| R299 | 39K |
| C302 | mf. .01 |
| Diode **303** | 1N277 |
| R304 | meg. 2.2 |
| R305 | 22K |
| R306 | 22K |
| C309 | mf. .022 |
| R312 | 33K |
| R311 | 100K |
| R332 | 25K |
| Diode **316** | 1N1323 |
| Diode **317** | 1N1323 |
| Trans. **313** | 2N1377 |
| R331 | 180K |
| R315 | 47K |
| R314 | 47K |
| Trans. **333** | 2N358A |
| R335 | 47K |
| R336 | ohms 1200 |
| R281 | do. 1000 |
| Trans. **334** | 2N1377 |
| Diode **321** | 1N751 |
| R337 | 12K |
| R338 | 11K |
| R318 | 33K |
| Diode **319** | 1N459 |
| Diode **320** | 1N459 |
| R322 | 22K |
| R323 | 10K |

| | |
|---|---|
| Diode **324** | 1N277 |
| Diode **329** | 1N277 |
| Trans. **325** | 2N1377 |
| **R328** | 10K |
| **R327** | 100K |
| **R326** | 10K |
| **R345** | 100K |
| Trans. **342** | 2N358A |
| **R347** | 22K |
| **R343** | 10K |
| **R344** | 10K |
| **R348** | 10K |
| **R349** | 100K |
| Trans. **350** | 2N358A |
| **R351** | 2.2K |
| Trans. **353** | 2N358A |
| Trans. **354** | 2N1377 |
| **R355** | 2.2K |
| **R356** | 47K |

*Square wave generator 89 and modulator 90*

| | |
|---|---|
| Trans. **357** | 2N1039 |
| **R359** | 47K |
| **R358** | ohms 82 |
| **R360** | 3.9K |
| Filter **98** | Burnell S-60105 |
| Trans. **362** | 2N358A |
| **R363** | ohms 620 |
| **R364** | 10K |
| **R365** | 4.7K |
| **R366** | 4.7K |
| **R368** | 10K |
| **R369** | 8.2K |
| Diode **370** | 1N751 |
| Trans. **361** | 2N1377 |
| Diode **367** | 1N459 |
| **R372** | 27K |
| **R374** | 10K |
| Diode **375** | 1N277 |
| Trans. **376** | 2N526 |
| **R377** | 27K |
| Diode **378** | 1N459 |
| Diode **379** | 1N751 |
| Trans. **383** | 2N1377 |
| Trans. **384** | 2N1377 |
| **R385** | 10K |
| **R386** | 10K |
| **C387** | mf .01 |
| **C388** | mf .01 |
| **R389** | 100K |
| **R402** | 100K |
| **R400** | 50K |
| **R403** | 50K |
| Diode **404** | 1N751 |
| Trans. **405** | 2N1377 |
| Diode **409** | 1N759 |
| **R408** | 4.7K |
| **R407** | 50K |
| **R406** | 10K |
| **C413** | mf 10 |
| **R415** | 10K |
| **R418** | 10K |
| **R416** | 27K |
| **R417** | 27K |
| Diode **419** | 1N751 |
| Diode **420** | 1N751 |
| Trans. **412** | 2N1377 |
| Trans. **422** | 2N1039 |
| **R423** | 47K |
| **R424** | 3.9K |
| **R426** | ohms 620 |
| Filter **92** | Burnell S-60106 |
| **R431** | ohms 560 |
| Trans. **425** | 2N1377 |

| | |
|---|---|
| Trans. **432** | 2N1377 |
| **R427** | 47K |
| **R428** | 27K |
| **R433** | 39K |
| **R429** | 10K |
| **R430** | 1.3K |
| **C436** | mf 10 |

*AGC 106*

| | |
|---|---|
| Trans. **438** | 2N1377 |
| **R440** | ohms 4700 |
| **R439** | 10K |
| **R455** | 100K |
| **C456** | mf .01 |
| Trans. **448** | 2N1377 |
| **R453** | 18K |
| **R454** | 6.8K |
| Diode **449** | 1N751 |
| Trans. **457** | 2N1377 |
| Trans. **458** | 2N1377 |
| **R459** | 5.6K |
| **R460** | 5K |
| **R462** | 18K |
| **R463** | 10K |
| Diode **464** | 1N277 |
| **C465** | mf 100 |
| Trans. **450** | 2N329A |
| Trans. **452** | 2N1377 |
| **R468** | 22K |
| **R470** | 1K |
| **R466** | 470K |
| **R469** | 1.2K |
| **R467** | 10K |
| Trans. **443** | 2N1377 |
| Trans. **444** | 2N1377 |
| Trans. **446** | 2N1377 |
| Trans. **447** | 2N1377 |
| **C445** | mf 1 |
| **C473** | mf 1 |
| **R474** | ohms 56 |
| **R477** | do 56 |
| **R475** | 10K |
| **R476** | 47K |
| **R480** | 4.7K |
| **R479** | 27K |
| **C489** | mf 100 |
| **C497** | mf 1 |
| **R490** | ohms 56 |
| **R496** | do 56 |
| **R492** | 10K |
| **R494** | 33K |
| **R495** | 25K |
| **C483** | mf 1 |
| Trans. **482** | 2N1377 |
| Trans. **484** | 2N1377 |
| **R485** | 2.7K |
| **R486** | 47K |
| **R487** | 3.9K |
| **R478** | 33K |

*Demodulator 107*

| | |
|---|---|
| **R500** | 50K |
| Trans. **502** | 2N1377 |
| Trans. **503** | 2N1039 |
| **R504** | 47K |
| **R505** | ohms 3900 |
| **R515** | do 4700 |
| **R516** | do 1000 |
| **R517** | do 1500 |
| Diode **518** | 1N751 |
| Trans. **519** | 2N1377 |
| Trans. **520** | 2N1039 |
| **R514** | 47K |
| **R522** | 47K |

| | |
|---|---|
| R523 | ohms 3900 |
| R525 | do 82 |
| Filter 524 | Burnell S-60106 |
| Diode 510 | 1W277 |
| Diode 512 | 1W277 |

*Sync. separator 115*

| | |
|---|---|
| Trans. 530 | 2N1377 |
| R532 | ohms 6800 |
| R531 | do 620 |
| Trans. 533 | 2N1377 |
| R534 | 10K |
| Diode 543 | 1N277 |
| Diode 535 | 1N277 |
| R536 | 15K |
| R539 | 100K |
| Diode 540 | 1N751 |
| R 542 | 220K |
| Trans. 546 | 2N1377 |
| R547 | 10K |
| R538 | 47K |
| C552 | mf .22 |
| R550 | 180K |
| Trans. 537 | 2N1377 |
| Trans. 553 | 2N1377 |
| R549 | ohms 8200 |
| R554 | 10K |
| R555 | 47K |
| R556 | 180K |
| Trans. 557 | 2N1377 |
| R558 | 10K |
| R562 | 3.3K |
| R563 | ohms 560 |
| C578 | mf .001 |
| R551 | 10K |
| R581 | 20K |
| R580 | 10K |
| R582 | 10K |
| R571 | 10K |
| R568 | ohms 1200 |
| C574 | mf 8 |
| C575 | mf .022 |

*Write gun ON-OFF Trigger 118*

| | |
|---|---|
| Trans. 590 | 2N1377 |
| Trans. 595 | 2N1377 |
| Diode 592 | 1N277 |
| Diode 594 | 1N277 |
| Diode 596 | 1N277 |
| C593 | mf .47 |
| C597 | mf 4.0 |
| R598 | 570K |
| R602 | 82K |
| R603 | 82K |
| C604 | mmf 47 |
| C605 | mmf 47 |
| R606 | ohms 6800 |
| C607 | mf .1 |

*Write Gun Control 119*

| | |
|---|---|
| Trans. 614 | 2N1377 |
| Trans. 619 | 2N1377 |
| Trans. 625 | 2N1377 |
| R615 | 25K |
| R616 | ohms 1000 |
| R617 | 47K |
| R620 | 68K |
| R623 | ohms 2200 |
| R624 | 470K |
| R622 | 430K |
| R630 | 150K |
| Diode 628 | N277 |
| Diode 629 | N277 |
| R626 | 10K |
| R634 | 43K |
| R635 | 62K |
| R636 | 82K |
| C627 | mf .001 |
| C633 | mf .002 |
| Trans. 637 | 2N341 |
| R638 | 100K |
| Diode 639 | 1N1323 |
| Diode 640 | 1N1323 |
| Trans. 642 | 2N358A |
| R643 | 22K |
| R644 | 22K |
| R645 | 100K |
| C641 | mf .01 |
| R647 | 100K |
| C648 | mf 4 |
| C649 | mf 4 |
| R650 | meg 1 |
| R652 | meg 1 |
| R653 | 68K |
| R654 | meg 2.2 |
| Diode 655 | 1N277 |
| R656 | meg 4.7 |
| C657 | mf .1 |

*Display tube line and sweep Generators 116, 117*

| | Line | Frame |
|---|---|---|
| Trans. 659 | 2N358A | |
| Trans. 665 | 2N358A | |
| Trans. 660 | 2N358A | |
| Trans. 664 | 2N358A | |
| Trans. 676 | 2N1377 | |
| Trans. 677 | 2N1377 | |
| Trans. 715 | 2N1377 | |
| Trans. 716 | 2N1377 | |
| Trans. 663 | 2N341 | |
| Trans. 666 | 2N1039 | |
| R678 | 10K | |
| R679 | 100K | |
| R680 | 10K | |
| R682 | 100K | |
| R683, 350 ohms | | |
| C662, 1.0 mf | | 100 mf. |
| R670, 270K | | 180K. |
| R672, 470K | | 470K. |
| R673, 680K | | 1.2 Meg. |
| R685, 20K | | 50K. |
| R686, 51K | | 120K. |
| R687, 50K | | 100K. |
| R688, 51K | | 240K. |
| R689, 50K | | 200K. |
| R700, 150K | | 510K. |
| R702 | 150K | |
| R703 | 10K | |
| Diode, 667 | 1N751 | |
| R704 | 15K | |
| R705, 2,200 ohms | | 1,800 ohms. |
| R706 | 100 ohms | |
| R669 | 50K | |
| R675 | 50K | |
| R708 | 3,300 ohms | |
| R709 | 2,000 ohms | |
| C712 | | .01 mf. |
| R707 | 220K | |
| Diode, 713 | | 1N1314. |
| R714 | | 47K. |
| R717 | | 15K. |
| R718 | | 50K. |
| R719 | | 3,300 ohms. |
| R720 | | 2,000 ohms. |

While I have described above the principles of my invention in connection with specific apparatus, it is to be clearly understood that this description is made only by way of example and not as a limitation to the scope of my invention.

What is claimed is:

1. A television system for transmitting a still picture comprising: image tube means including target means for converting an optical image into a corresponding electrical characteristic pattern, and means for scanning an electron beam thereby to convert said pattern into a time-based video signal; means for generating recurrent sequences of periodic frame synchronizing signals and intervening line synchronizing signals for said scanning means; means for generating a control signal; means for modulating an input signal to provide an output transmission signal; selectively actuable control means coupled to said pulse generating means for initiating a new sequence of said synchronizing signals, said control means including means for coupling said control signal generating means to said modulating means for a predetermined period during the first frame synchronizing signal of said new sequence thereby to modulate said transmission signal with said control signal; means for coupling said image tube means to said modulating means thereby to modulate said transmission signal with said video signal during said new sequence of said synchronizing signals following said first frame synchronizing signal thereof; means for demodulating said transmission signal to recover said control and video signals; means for separating said control signal from said recovered signals; means for separating said synchronizing signals from said recovered signals; direct viewing storage cathrode ray tube means having display screen means and selectively actuable means for converting said separated video signal into an optical image on said display screen means, said cathrode ray tube means including storage means for maintaining said optical image on said display screen means for a finite time following deactuation of said storage tube converting means; first means coupling said control signal separating means to said storage means for erasing a previously stored image from said display screen means responsive to said control signal; second means coupling said control signal separating means to said cathode ray tube converting means for actuating the same responsive to said control signal thereby to convert said separated video signal into a new optical image on said display screen means; and third means coupling said synchronizing signal separating means to said cathode ray tube converting means for de-actuating the same responsive to the next said frame synchronizing signal following said first frame synchronizing signal of said new sequence.

2. The system of claim 1 wherein said modulating means comprises means for amplitude modulating said input signal onto a square wave carrier having a frequency in the voice band range, wherein said control signal is a tone relatively low in frequency with respect to the highest frequency of said video signal, and wherein said separating means comprises band pass filter means for passing only said tone to the exclusion of other frequencies.

3. The system of claim 2 wherein said demodulator means comprises full-wave rectifier means coupled to receive said transmission signal, and band pass filter means coupled to said rectifier means for passing only the frequencies of said video signal to the exclusion of higher frequencies.

4. The system of claim 1 wherein said cathode ray tube means includes means for generating a writing electron beam responsive to said video signal, means for generating a reading electron beam, means for generating pulses having a frequency relatively high with respect to the frequencies of said video signal, and means for coupling said pulse generating means to said writing and reading beam generating means for alternating disabling the same, respectively.

5. The system of claim 1 wherein said image tube target means is photoconductive; said image tube converting means compising means for generating an electron beam and means for scanning the same over said target means; and further comprising a load resistor connected to a source of potential, an electrical lead connecting said resistor to said target means, and a conductive shield for said lead; said video signal coupling means comprising an amplifier having an input circuit coupled to said lead adjacent said resistor and having an output circuit coupled to said modulating means for supplying said video signal thereto; and feedback means coupling said output circuit to said shield for feeding-back a portion of the video signal in said output circuit in phase to said shield thereby to vary the potential of said shield in response to the amplitude of said video signal.

6. The system of claim 1 wherein said image tube target means is photoconductive and includes a signal output circuit coupled thereto; said image tube converting means comprising means for generating an electron beam and means for scanning the same over said target means thereby to develop said video signal in said output circuit, said target means including means for providing said video signal with one level extremity responsive to large area background colors on said optical image and its other level extermity responsive to black areas on said optical image; said video signal coupling means including means for amplifying said video signal, means for clipping said other extremity to a predetermined level, and means for clamping said one extremity to a reference potential level thereby to flatten the response of said image tube to different background colors in said optical image.

7. The system of claim 1 wherein said modulating means comprises oscillator means for generating space wave carrier signal pulses, an input circuit for receiving said video and control signals, an output circuit for said transmission signal, switching means coupling said input and output circuits, and means coupling said oscillator means to said switching means for actuating the same in response to said carrier signal pulses thereby to pulse said video and control signals on and off at the frequency of said carrier pulses to provide said transmission signal.

8. The system of claim 7 further comprising means coupled to said signal input circuit for inverting said video and control signals and for reducing the amplitude thereof by one-half, and means for mixing said inverted half-amplitude signals with said pulsed signals whereby the modulating signal component is cancelled from said transmission signal.

9. The system of claim 1 further comprising degenerative automatic gain control means coupling said modulating and demodulating means.

10. The system of claim 9 wherein said automatic gain control means comprises a first input circuit for receiving said transmission signal from said modulating means, a second input circuit coupled to receive said recovered video signal from said demodulating means, means for detecting the peaks of said synchronizing signals in said recovered video signal, means for integrating said detected peaks to provide a direct current control signal responsive to the amplitude of said peaks, and means coupled to said first input circuit for varying the level of said transmission signal responsive to said control signal.

11. A television system for transmitting a still picture comprising: image tube means having photosensitive target means for converting an optical image exposed thereto into a a corresponding electrical characteristic pattern and for storing the same for a finite time, said image tube means including means for generating an electron beam and means for scanning the same over said target means for converting said pattern into a time-based video signal; selectively actuable shutter means for exposing said target means to an optical image; means for generating recurrent sequences of frame synchronizing pulses and intervening line synchronizing pulses; means coupling said pulse generating means to said beam generating means for disabling the same during a pulse; means coupling said pulse generating means to said scanning means for actuating the same to scan said beam over said target means in raster fashion; means for providing a regularly pulsating signal; means for modulating an input signal to provide an output transmission signal; control means coupled to said pulse generating means for initiating a new sequence of said pulses, said control means including means for actuating said shutter means for a predetermined period during the first frame pulse of said new sequence to expose said optical image to said target means whereby a video signal responsive to said image is provided during said new sequence following said first frame pulse thereof, said control means including means for coupling said pulsating signal to said modulating means for a predetermined period during said first frame pulse thereby to modulate said transmission signal, means for coupling said video signal to said modulating means thereby to modulate said transmission signal; means for demodulating said transmission signal to recover said pulsating and video signals; means coupled to said demodulator means for separating said pulsating signal; means coupled to said demodulator means for separating said frame and line pulses from said video signal; direct viewing storage cathode ray tube means having display screen means, said cathode ray tube means including selectively actuable means coupled to said demodulating means for converting a video signal into an optical image on said display screen means, said cathode ray tube means including storage means for maintaining said optical image on said display screen means for a finite time following deactuation of said stoarge tube converting means; first means coupling said pulsating signal separating means to said storage means for erasing a previously stored optical image from said display screen means responsive to said pulsating signal; second means coupling said pulsating signal separating means to said storage tube converting means for actuating the same responsive to said pulsating signal thereby to convert said video signal into a new optical image on said display screen means; and third means coupling said pulse separating means to said storage tube converting means for deactuating the same responsive to the next frame pulse following said first frame pulse.

12. The system of claim 11 wherein said modulating means comprises means for amplitude modulating said input signal onto a square wave carrier having a frequency in the voice band range; said pulsating signal being a tone relatively low in frequency with respect to the highest frequency of said video signal; said demodulator means comprising full-wave rectifier means coupled to receive said transmission signal, and fisrt band pass filter means for passing only the frequencies of said video signal to the exclusion of higher frequencies; said pulsating signal separating means comprising second band pass filter means for passing only said tone to the exclusion of other frequencies; said storage tube stor-means comprising storage electrode means; said storage means comprising storage elcertode means; said storage tube converting means comprising means coupled to said demodulator means for generating a writing electron beam responsive to said video signal, means for scanning said writing beam over said storage electrode means, means coupling said pulse sepjarating means to said scanning means whereby said writing beam is scanned over said storage electrode in raster fashion and said video signal is converted into an electrical characteristic pattern on said storage electrode means corresponding to said optical image, means for generating a reading electron beam, and means for flooding said storage electrode means with said reading beam thereby to convert the pattern thereon into an optical image on said display screen means; said first coupling means comprising first switching means actuated in response to said tone for applying an erasing potential to said storage electrode means; said second coupling means comprising second switching means actuated in response to said tone for enabling said writing beam generating means; said third coupling means coupling said puse separating means to said second switching means for actuating the same to disable said writing beam means in response to the next frame pulse following said first frame pulse.

13. The system of claim 11 wherein said modulator means includes means for cancelling the video signal component of said transmission signal; and further comprising band pass filter means for passing only the carrier and lower side band components to the exclusion of the upper side band component.

14. The system of claim 11 wherein said control means comprises switching means having two positions, manually actuated means for actuating said switching means to said first position thereof, means coupling said switching means to said shutter means for actuating the same responsive to actuation of said switching means to said first position thereof, said switching means in said first position thereof coupling said pulsating signal to said modulating means, means coupling said switching means to said pulse generating means for intitiating said new sequence of pulses responsive to actuation of said switching means to said first position thereof, said switching means including time delay means for actuating said switching means to said second position thereof thereby establishing said periods, said periods being shorter than a said frame synchronizing pulse.

15. The system of claim 14 further comprising first means for indicating when said system is in a condition to transmit a picture and second means for indicating when said system is transmitting a picture, and second switching means having two positions, said second switching means in said first position thereof actuating said first indicating means and in said second position thereof actuating said second indicating means, means coupling said first-named switching means to said second switching means for actuating the same to said second position thereof in response to actuation of said first-named switching means to said first position thereof; and means coupling said pulse generating means to said second switching means for actuating the same to said first position thereof responsive to the next frame pulse following said first frame pulse of said new sequence.

16. The system of claim 11 wherein said control means comprises a relay having an operating coil, a capacitor normally coupling said coil to a source of energizing potential, manually actuated switch means for momentarily short-circuiting said coil and caparitor whereby said capacitor discharges through said coil to energize the same, said relay having first contacts for maintaining said short-circuit when said coil is enregized whereby said capacitor fully discharges through said coil thereby establishing said periods, said shutter means including solenoid means for actuating the same, said relay having second contacts coupled to energize said solenoid when said coil is energized, said relay having third contacts coupling said pulsating signal to said modulating means when said coil is energized, said pulse generating means including means for initiating another sequence of pulses responsive to completion of a previous sequence, said relay having fourth contacts coupled to said initiating means when said said coil is energized for actuating the same to initiate said new sequence prior to completion of a previous sequence.

17. The system of claim 11 wherein said frame synchronizing pulses are substantially longer than said line synchronizing pulses; wherein said frame and line synchronizing pulse separating means comprises first amplifier means having an input circuit coupled to said demodulator means for receiving the recovered video signal therefrom, said first amplifier means having an output circuit, said first amplifier means including means for rendering the same substantially non-conductive in the absence of a synchronizing pulse and conductive in response to a synchronizing pulse thereby providing said line and frame synchronizing pulses only in said output circuit, time constant means coupled to said output circuit for providing a predetermined potential level only in response to said frame synchronizing pulses, and second amplifier means having an input circuit coupled to said time constant means, said second amplifier means having an output circuit, said second amplifier means including means for rendering the same substantially non-conductive in the absence of said predetermined potential level and conductive in response to said predetermined potential level thereby providing said frame synchronizing pulses only in said second amplifier means output circuit; and wherein said storage tube converting means includes means coupled to said demodulating means for generating an electron beam responsive to said recovered video signal, and means for rectilinearly scanning said beam coupled to said frame and line synchronizing pulse separating means and actuated by said frame and line synchronizing pulses, respectively.

18. A television system for transmitting a still picture comprising: image tube means having photosensitive target means for converting an optical image exposed thereto into a corresponding electrical characteristic pattern and for storing the same for a finite time, a signal output circuit coupled to said target means, means for generating an electron beam, and means for rectilinearly scanning said beam over said target means thereby to provide a time-based video signal in said output circuit responsive to said pattern; line and frame sweep generating means respectively coupled to said scanning means; means for generating frame blanking pulses coupled to said frame sweep generating means; means for generating line blanking pulses which are relatively short with respect to said frame blanking pulses coupled to said line sweep generating means; timing means coupled to said pulse generating means for actuating the same, respectively, to provide recurrent sequences of frame pulses and intervening line pulses; means coupled to said pulse generating means for non-additively mixing said frame and line pulses and for coupling the same to said beam generating means thereby to disable the same during each pulse; means for generating a regularly pulsating signal; means for modulating an input signal to provide an output transmission signal; control means coupled to said timing means for initiating a new sequence of pulses, said control means including means for actuating said shutter means for a predetermined period during the first frame pulse of said new sequence to expose said optical image to said target means whereby a video signal responsive to said image is provided during said new sequence following said first frame pulse thereof, said control means including means for coupling said pulsating signal to said modulating means for a predetermined period during said first frame pulse thereby to modulate said transmission signal, means for coupling said video signal to said modulating means thereby to modulate said transmission signal; means for demodulating said transmission signal to recover said pulsating and video signals; means coupled to said demodulator means for separating said pulsating signal; means coupled to said demodulator means for separating said frame and line pulses from said video signal; direct viewing storage cathode ray tube means having display screen means, said cathode ray tube means including selectively actuable means coupled to said demodulating means for converting a video signal into an optical image on said display screen means, said cathode ray tube means including storage means for maintaining said optical image on said display screen means for a finite time following deactuation of said storage tube converting means; first means coupling said pulsating signal separating means to said storage means for erasing a previously stored optical image from said display screen means responsive to said pulsating signal; second means coupling said pulsating signal separating means to said storage tube converting means for actuating the same responsive to said pulsating signal thereby to convert said video signal into a new optical image on said display screen means; and third means coupling said pulse separating means to said storage tube converting means for deactuating the same responsive to the next frame pulse following said first frame pulse.

19. The system of claim 18 wherein said timing means comprises a source of timing pulses, first pulse counting means coupled to said source for counting down said timing pulses, first pulse output means coupled to said first counting means for providing a first output pulse in response to a predetermined pulse count thereby, said first pulse output means being coupled to said line blanking pulse generating means for actuating the same to provide a line blanking pulse in response to each said first output pulse, first means for resetting said first counting means in response to each said first output pulse, second pulse counting means coupled to said first pulse output means for counting down said first output pulses, second pulse output means coupled to said second counting means for providing a second output pulse in response to a predetermined pulse count thereby, said second pulse output means being coupled to said frame blanking pulse generating means for actuating the same to provide a frame blanking pulse in response to each said second output pulse, and second means for resetting said second counting means in response to said second output pulses; and wherein said control means is coupled to said second resetting means for actuating the same to reset said second counting means thereby to initiate said new sequence of blanking pulses.

20. The system of claim 18 wherein said timing means comprises a source of timing pulses, a first pulse counting chain coupled to said source for counting-down said timing pulses and comprising a first plurality of bistable multivibrators each having a pulse output circuit and a resetting circuit, a first diode logic circuit, first switching means for selectively coupling said first logic circuit to said pulse output circuits of said first plurality of multivibrators thereby to provide a first output pulse in response to a predetermined pulse count by said first counting chain, said first logic circuit being coupled to said line blanking pulse generating means for actuating the same to provide a line blanking pulse in response to each said first output pulse, means coupling said first logic circuit to said resetting circuits of said first plurality of multivibrators for actuating the same to initiate a new count in response to each said first output pulse; a second pulse counting chain coupled to said first logic circuit for counting-down said first output pulses and comprising a second plurality of bistable multivibrators each having a pulse output circuit and a resetting circuit, a second diode logic circuit, second switching means for selectively coupling said second logic circuit to said pulse output circuits of said second plurality of multivibrators thereby to provide a second output pulse in response to a predetermined pulse count by said second counting chain, said second logic circuit being coupled to said frame blanking pulse generating means for actuating the same to provide a frame blanking pulse in response to each said second output pulse, means coupling said second logic circuit to said resetting circuits of said second plurality of multivibrators for actuating the same to initiate a new count in response to each said second output pulse; and wherein said control means is coupled to trigger pulse generating means, said trigger pulse generating means being coupled to last-named coupling means for actuating said resetting circuits of said second plurality of multivibrators thereby to initiate said new sequence of blanking pulses.

21. The system of claim 18 wherein said video signal coupling means comprises means coupled to said blanking pulse generating means for inserting said blanking pulses in said video signal, and means for clamping the pedestals of said blanking pulses to a predetermined direct current level thereby establishing a direct current level for said video signal.

22. The system of claim 18 wherein said modulating means comprises first and second input circuits for respectively receiving said video and pulsating signals, means coupled to said input circuits for non-additively mixing said video and pulsating signals to provide a modulating signal, band pass filter means coupled to said mixing means for passing only the frequencies of said video signal to the exclusion of higher frequencies, the frequency of said pulsating signal being below the highest frequency of said video signal, amplifier means coupled to said filter means and including means for setting a predetermined direct current level for said modulating signal, said amplifier means having an output circuit for the modulating signal resulting therefrom, oscillator means for generating square wave carrier signal pulses having a frequency in the voice band range and having an output circuit; a diode resistor switch network coupled across said amplifier output circuit and comprising means including first and second resistors serially coupled by a first diode, and means including a second diode coupled across said first diode and second resistor, said oscillator means output circuit being coupled to said second diode, said second diode being normally back-biased whereby current flows in said first diode and second resistor responsive to said modulating signal in the absence of a carrier pulse, said second diode being rendered conductive responsive to a carrier pulse thereby back-biasing said first diode to cut off current flow therein and in said second resistor in the presence of a carrier pulse whereby an output signal is developed across said second resistor responsive to said modulating signal which is pulsed on and off at the frequency of said carrier pulses; means coupled to said amplifier output circuit for inverting said modulating signal and for reducing the amplitude thereof by one-half, said inverting means being coupled to said second resistor for mixing said inverted half-amplitude signals therein with said pulsed modulating signal whereby the modulating signal component is cancelled from said output signal; and band pass filter means coupled to said second resistor for passing the carrier and lower side band frequency components to the exclusion of the upper side band frequency component in said output signal thereby to provide said transmission signal.

23. The system of claim 18 wherein said scanning means comprises vertical and horizontal deflection yokes, wherein said modulating means includes means for amplitude modulating said input signal onto a carrier signal having a frequency in the voice band range; and wherein each of said sweep generating means comprises an input circuit coupled to the respective blanking pulse generating means, first amplifying means coupled to said input circuit, capacitor-discharge saw-tooth wave form generating means, switching means coupling said first amplifying means to said saw-tooth generating means for discharging the same responsive to a blanking pulse, second amplifying means coupled to said saw-tooth generating means for amplifying the saw tooth wave form signals produced thereby, and means for feeding-back the amplified saw-tooth signals to said saw-tooth generating means, said second amplifying means being coupled to energize the respective deflection yoke; said sweep generating means, second amplifier means and deflection yoke being direct current coupled.

24. A television system for transmitting a still picture comprising: image tube means having photosensitive target means for converting an optical image exposed thereto into a corresponding electrical characteristic pattern and for storing the same for a finite time, said image tube means including means for generating an electron beam and means for rectilinearly scanning the same over said target means for converting said pattern into a time-based video signal; selectively actuable shutter means for exposing said target means to an optical image; means for generating recurrent sequences of frame synchronizing pulses and intervening line synchronizing pulses which are relatively short with respect to said frame synchronizing pulses; means coupling said pulse generating means to said beam generating means for disabling the same during a pulse; means coupling said pulse generating means to said scanning means for actuating the same to scan said beam over said target means in raster fashion; means for generating a tone having a frequency relatively low with respect to the frequencies of said video signal; means for inserting said synchronizing pulses in said video signal to provide a modulating signal; means for amplitude modulating said modulating signal onto a carrier signal to provide a transmission signal; control means coupled to said pulse generating means for initiating a new sequence of said pulses, said control means including means for actuating said shutter means for a predetermined period during the first frame pulse of said new sequence to expose said optical image to said target means whereby a video signal responsive to said image is provided during said new sequence following said first frame pulse thereof, said control means including means for coupling said tone generating means to said modulating means for a predetermined period during said first frame pulse whereby said tone is superimposed on said modulating signal; means for demodulating said transmission signal to recover said video signal; band pass filter means coupled to said demodulating means for passing only said tone to the exclusion of other frequencies; means coupled to said demodulating means for separating said frame and line synchronizing pulses from said modulating signal; a storage cathode ray tube having charge storage electrode means, display screen means, means for generating a writing electron beam, selectively actuable means for coupling said writing beam generating means to said demodulating means whereby said writing beam is responsive to said video signal, means for rectilinearly scanning said writing beam over said storage electrode means, means coupling said pulse separating means to said scanning means whereby said writing beam is scanned over said storage electrode means in raster fashion to convert said video signal into a charge pattern on said storage electrode means corresponding to said optical image, means for generating a reading electron beam, and means for flooding said storage electrode means with said reading beam thereby to convert said charge pattern into an optical image on said display screen means; first switching means having first and second positions, said first switching means being coupled to said filter means and actuated to said second position thereof responsive to said tone, said first switching means including means for actuating the same to said first position thereof in the absence of said tone and prior to termination of said first frame pulse of said new sequence, said first switching means in said second position thereof coupling said storage electrode to a source of erasing potential for erasing said charge pattern therefrom, said first switching means in said first position thereof coupling said display screen to a source of anode potential and decoupling the same in in said second position; second switching means having first and second positions, means coupling said first switching means to said second switching means for actuating the same to said second position thereof responsive to actuation of said first switching means to said second position thereof; means coupling said pulse separating means to said second switching means for actuating the same to said first position thereof responsive to termination of the next said frame pulse following said first frame pulse of said new sequence; means coupling said second switching means to said writing beam coupling means for actuating the same to couple said writing beam generating means to said demodulating means responsive to actuation of said second switching means to said second position thereof and to decouple the same responsive to actuation of said second switching means to said first position thereof whereby a new charge pattern is written onto said storage electrode during the first frame of said new sequence; and means coupling said pulse separating means to said writing beam coupling means for deactuating the same to decouple said writing beam generating means from said demodulating means during said synchronizing pulses.

25. The system of claim 24 further comprising means for generating pulses having a frequency relatively high with respect to said carrier; and means coupling said last-named pulse generating means to said writing beam coupling means and to said reading beam generating means for alternately pulsing said reading and writing beams on and off respectively.

26. The system of claim 24 wherein said first switching means comprises reed relay means tuned to the frequency of said tone and having a first operating coil coupled to said filter means for energization responsive to said tone, said reed relay having contacts actuated in response to energization of the operating coil thereof, and a second relay having a second operating coil coupled for energization by said reed relay contacts responsive to actuation thereof, means including first contacts on said second relay for maintaining said second coil energized for a predetermined time longer than the period of said tone and shorter than the duration of said first frame pulse, said second relay having second contacts coupling said storage electrode means to said source of erasing potential in response to energization of said second coil and to a source of writing potential in response to de-energization of said second coil, said second relay having third contacts coupling said display screen to a source of anode potential when said second coil is de-energized and decoupling the same in response to energization of said second coil; said second switching means comprising bistable multivibrator means having first input circuit means for switching the same to one stable condition in response to application of a first signal, said second relay having fourth contacts coupling said first input circuit means to a source of potential in response to energization of said second coil thereby to provide said first input signal, said bistable means having second input circuit means for switching the same to the other stable condition thereof in response to application of a second signal, said second input circuit means being coupled to said synchronizing pulse separating means for impressing said frame synchronizing pulses thereon, said second input circuit means including time delay means for providing said second input signal in response to the trailing edge of the next frame synchronizing pulse following said first synchronizing pulse of said new sequence, and third relay means having a third operating coil coupled to said bistable means and energized thereby when said bistable means is in said other stable condition, said third relay having contacts coupled to actuate said writing beam control means responsive to de-energization of said third coil.

27. The method of transmitting a still picture comprising the steps of: exposing an optical image to the target means of an image tube for a predetermined period, transmitting a control signal for a predetermined period, converting the image on said target means into a time-based video signal and transmitting the same during an interval following said periods, receiving said control signal and applying the same to storage signal-to-image converting means for erasing a previously stored image, and receiving said video signal and converting the same into an optical image on said converting means.

28. The method of transmitting a still picture comprising the steps of: generating recurrent sequences of frame synchronizing pulses and intervening line synchronizing pulses, initiating a new sequence of pulses, exposing an optical image to the target means of an image tube for a predetermined period during the first frame pulse of said new sequence, generating a tone signal for a predetermined period during said first pulse, amplitude modulating said tone signal onto a carrier and transmitting the resultant signal, rectilinearly scanning said target means once with an electron beam in synchronism with said pulses during said new sequence following said first pulse to convert the optical image on said target means into a video signal, modulating said carrier with said video signal and transmitting the resultant signal, receiving the transmittal signals and recovering said tone and video signals, converting said tone signal into a control signal, applying said control signal to the storage means of direct viewing storage cathode ray tube means for erasing a previously stored image, and converting said video signal into an electron beam in said storage tube means and scanning the same once over said storage means in synchronism with said pulse during said new sequence following said first pulse.

29. The method of claim 28 comprising the further steps of combining said pulses, video signal and tone signal to provide a modulating signal whereby said tone signal is superimposed upon said first frame pulse, and separating said pulses from said recovered signal.

30. The method of transmitting a still picture comprising the steps of: generating recurrent sequences of frame synchronizing pulses and intervening line synchronizing pulses, initiating a new sequence of pulses, exposing an optical image to the target means of an image tube for a predetermined period during the first frame pulse of said new sequence, generating a square wave carrier signal, generating a tone signal for a predetermined period during said first pulse, amplitude modulating said tone signal onto said carrier, rectilinearly scanning said target means once with an electron beam in synchronism with said pulses during said new sequence following said first pulse to convert the optical image on said target means into a video signal, amplitude modulating said video signal onto said carrier, cancelling the modulating signal and upper sideband components from the modulated signal and transmitting the resultant signal receiving said resultant signal and recovering said tone and video signals, converting said tone signal into a control signal, applying said control signal to the storage means of direct viewing storage cathode ray tube means for erasing a previously stored image, and converting said video signal into an electron beam in said storage tube means and scanning the same once over said storage means in synchronism with said pulses during said new sequence following said first pulse.

31. The method of claim 30 wherein said recovering comprises the stesp of doubling the frequency of said resultant signal and filtering out all frequencies above the frequency of said video signal.

32. The method of claim 30 wherein said square wave carrier signal has a frequency in the voice band range and said tone signal has a frequency substantially lower than said carrier.

33. The method of transmitting a still picture comprising the steps of: generating recurrent sequences of frame synchronizing pulses and intervening line synchronizing pulses, initiating a new sequence of pulses, exposing an optical image to the target means of an image tube for a predetermined period during the first frame pulse of said new sequence, generating a control signal for a predetermined period during said first pulse, rectilinearly scanning said target means once with an electron beam in synchronism with said pulses during said new sequence following said first pulse to convert the optical image on said target means into a video signal, combining said pulses, control signal and video signal to provide a modulating signal, amplitude modulating said modulating signal onto a carrier signal and transmitting the resultant signal, receiving the transmitted signal and recovering said modulating signal, separating said control signal and said pulses from said modulating signal, respectively, converting said control signal into an erasing potential and applying the same to the storage electrode means of a direct viewing storage cathode ray tube to erase a previously stored image therefrom, initiating a writing electron beam simultaneously with said control signal, modulating said writing beam with said modulating signal, rectilinearly scanning said writting beam once over said storage electrode means in synchronism with said pulses during said new sequence following said first pulse, flooding said storage electrode means with a reading electron beam, and terminating said writing beam simultaneously with the end of said new sequence.

34. The method of claim 33 comprising the additional step of pulsing said writing and reading beams alternately on and off, respectively, at a frequency substantially higher than the frequency of said carrier signal.

References Cited by the Examiner

UNITED STATES PATENTS

| | | | |
|---|---|---|---|
| 2,879,442 | 3/1959 | Kompfner et al. | 315—12 |
| 2,929,869 | 3/1960 | Hines | 178—6.8 |
| 3,061,670 | 10/1962 | Oster et al. | 178—6.8 |
| 3,084,213 | 4/1963 | Lemelson | 178—5.6 |

DAVID G. REDINBAUGH, *Primary Examiner.*

J. O'BRIEN, *Assistant Examiner.*